US007149784B2

(12) United States Patent
Kitada et al.

(10) Patent No.: US 7,149,784 B2
(45) Date of Patent: Dec. 12, 2006

(54) SYSTEM, COMPUTER PROGRAM PRODUCT AND METHOD FOR EXCHANGING DOCUMENTS WITH AN APPLICATION SERVICE PROVIDER AT A PREDETERMINED TIME

(75) Inventors: Hiroshi Kitada, Tuckahoe, NY (US); Shogo Hyakutake, Boonton Township, NJ (US); Hiroaki Ishizuka, San Jose, CA (US); Minoru Aoshima, Edgewater, NJ (US); Akio Kizawa, Ridgewood, NJ (US)

(73) Assignees: Ricoh Company, Ltd., Tokyo (JP); Ricoh Corporation, West Caldwell, NJ (US)

( * ) Notice: Subject to any disclaimer, the term of this patent is extended or adjusted under 35 U.S.C. 154(b) by 803 days.

(21) Appl. No.: 09/839,221

(22) Filed: Apr. 23, 2001

(65) Prior Publication Data

US 2002/0156834 A1    Oct. 24, 2002

(51) Int. Cl.
*G06F 15/16* (2006.01)

(52) U.S. Cl. .................. 709/207; 709/219; 709/232

(58) Field of Classification Search .......... 709/203, 709/232, 301, 217, 213, 216, 206, 207, 219; 455/461

See application file for complete search history.

(56) References Cited

U.S. PATENT DOCUMENTS

| | | | |
|---|---|---|---|
| 5,519,786 A * | 5/1996 | Courtney et al. ........... 382/159 |
| 6,009,442 A | 12/1999 | Chen et al. | |
| 6,262,732 B1 | 7/2001 | Coleman et al. | |
| 6,385,655 B1 * | 5/2002 | Smith et al. ................. 709/232 |
| 6,480,304 B1 | 11/2002 | Os et al. | |
| 6,496,206 B1 | 12/2002 | Mernyk et al. | |
| 6,591,289 B1 * | 7/2003 | Britton ........................ 709/203 |
| 6,615,233 B1 * | 9/2003 | Davis et al. ................. 709/203 |
| 6,658,452 B1 * | 12/2003 | Becker et al. ............... 709/201 |
| 6,782,003 B1 * | 8/2004 | Giroux et al. ............... 370/466 |
| 6,912,398 B1 * | 6/2005 | Domnitz ...................... 455/461 |
| 2001/0016850 A1 * | 8/2001 | Ogawa ..................... 707/104.1 |
| 2002/0178213 A1 * | 11/2002 | Parry .......................... 709/203 |

OTHER PUBLICATIONS

U.S. Appl. No. 09/839,221, filed Apr. 23, 2001, Pending.
U.S. Appl. No. 10/294,607, filed Nov. 15, 2002, Pending.
U.S. Appl. No. 10/243,643, filed Sep. 16, 2002, Pending.

(Continued)

*Primary Examiner*—Paul H. Kang
(74) *Attorney, Agent, or Firm*—Oblon, Spivak, McClelland, Maier & Neustadt, P.C.

(57) ABSTRACT

A system, computer program product, and method for managing ASP documents includes requesting a transfer of an ASP document at an ASP user device connected to a remote document manager and a remote ASP via a network such as the Internet, establishing a predetermined time for effecting a transfer of the ASP document, and transferring the ASP document at a predetermined time via the network. According to one embodiment of the first aspect, the step of requesting a transfer may include sending a deferred transfer request to the remote document manager via the network when the ASP user device logs on to the remote document manager. In this regard, the user requests a transfer by inputting a deferred transfer option from a menu received from the remote document manager via the network. The step of establishing a predetermined time for effecting a transfer of the ASP document may include inputting the predetermined time, and sending the predetermined time to the remote document manager via the network or requesting the remote document manager to establish the predetermined time without sending a predetermined time to the remote document manager.

51 Claims, 18 Drawing Sheets

OTHER PUBLICATIONS

U.S. Appl. No. 10/243,645, filed Sep. 16, 2002, Pending.
U.S. Appl. No. 09/795,438, filed Mar. 1, 2001, Pending.
U.S. Appl. No. 09/785,433, filed Feb. 20, 2001, Pending.
U.S. Appl. No. 09/839,263, filed Apr. 23, 2001, Pending.
U.S. Appl. No. 09/840,155, filed Apr. 24, 2001, Pending.
U.S. Appl. No. 09/949,969, filed Sep. 12, 2001, Pending.
U.S. Appl. No. 10/116,162, filed Apr. 5, 2002, Pending.
U.S. Appl. No. 09/684,965, filed Oct. 10, 2000, Pending.

* cited by examiner

FIG. 5A

| User ID | Profile Name | Industrial Category |
|---|---|---|
| 071870 | Invoices<br>Employee Benefits<br>Service Contracts | Accounting<br>Insurance<br>Legal |
| 090269 | Grocery Bills | General |

| Industrial Category | Encryption | Access Level Control | Phisical Storage | Security Policy | Internet Security | Offsite Backup | Audit | Collabolation | Workflow Transmission | Archiving | Image Input | Selected ASP |
|---|---|---|---|---|---|---|---|---|---|---|---|---|
| Real Estate |  | Necessary |  | Necessary |  |  |  |  | Necessary |  | Necessary | ASP 6 |
| Medical |  | Necessary |  |  | Necessary | Necessary |  |  | Necessary | Necessary |  | ASP 4 |
| Insurance |  | Necessary |  |  | Necessary |  | Necessary |  |  | Necessary | Necessary | ASP 5 |
| Accounting |  | Necessary |  | Necessary | Necessary |  | Necessary | Necessary | Necessary |  |  | ASP 3 |
| Legal |  | Necessary | Necessary | Necessary | Necessary |  | Necessary | Necessary |  | Necessary |  | ASP 2 |
| Financial | Necessary | Necessary | Necessary | Necessary | Necessary | Necessary | Necessary |  |  | Necessary |  | ASP 1 |
| Geberal |  |  |  |  | Necessary |  |  |  |  |  |  | ASP 1-6 |

FIG. 5C

| Special Service | ASP |
|---|---|
| Print and Delivery | ASP1 |
| Digital Signature | ASP7 |

550 → ; 551, 553

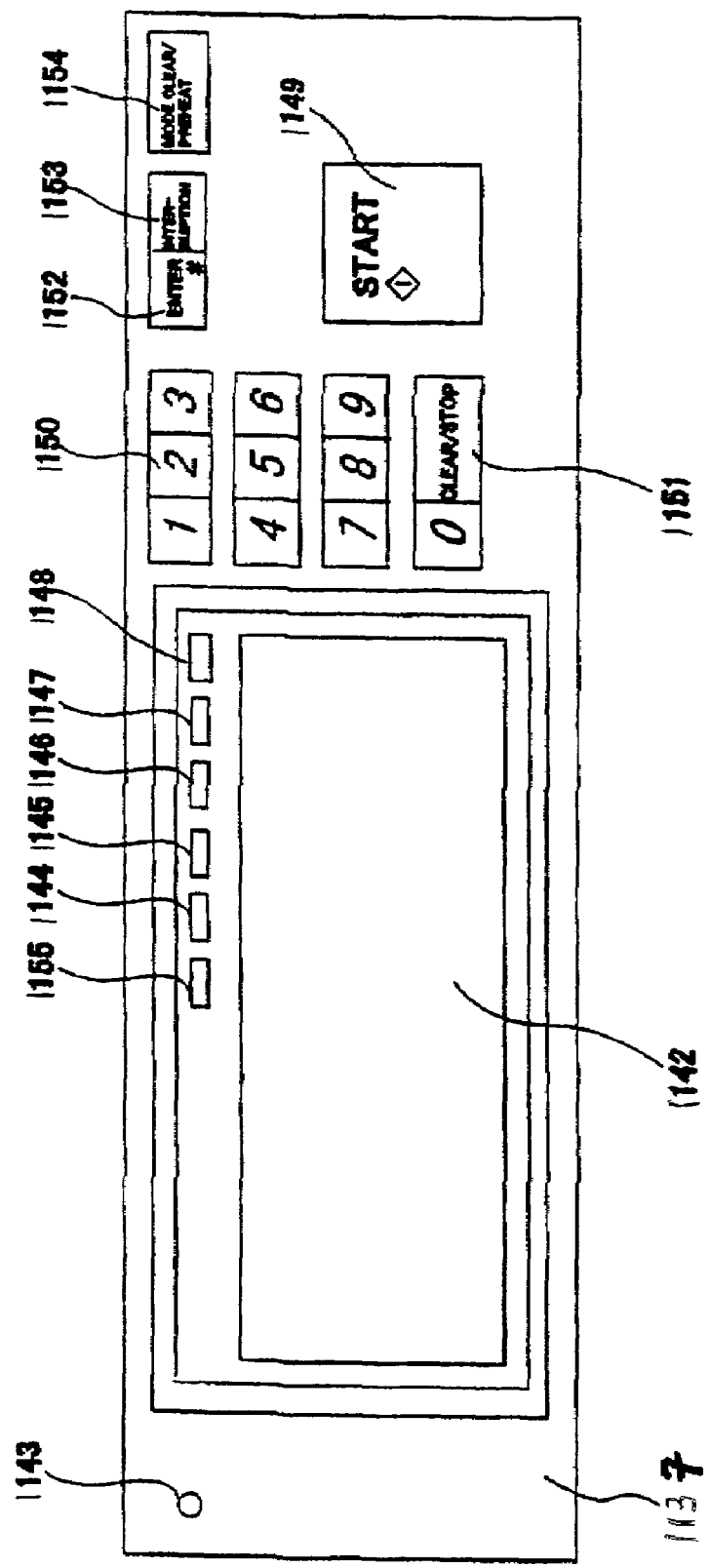

SYSTEM, COMPUTER PROGRAM PRODUCT AND METHOD FOR EXCHANGING DOCUMENTS WITH AN APPLICATION SERVICE PROVIDER AT A PREDETERMINED TIME

BACKGROUND OF THE INVENTION

1. Field of the Invention

The present invention is directed to methods, computer-based systems and computer program products for exchanging documents, and in particular documents retrieved from, or stored to, application service providers.

2. Discussion of the Background

An application service provider (ASP) is an entity, typically a company, that offers users remote access to software applications and related services that would otherwise have to be located on the user's local computer. For example, ASPs can provide searchable databases of legal, medical, financial, educational, scientific, or marketing documents to individuals and/or companies via the Internet. Alternatively, some companies may provide in-house type ASPs whereby shared software applications and services are located on a company computer accessible by the employees via a company network. Thus, as used herein, the term "ASP" has a broad meaning that includes a provider that allows a user to use an application not loaded on the user's local computer.

Today, there are a great number of ASPs providing various kinds of documents and services to a user. For example, one ASP may provide legal documents while another provides marketing, educational, scientific, financial, or medical documents. An example of a conventional network of ASPs connected to a user is shown in FIG. 1. As seen in FIG. 1, document ASPs 10, 20, 30, and 40 are connected to user 72 via the Internet 50. User 72 includes a personal computer (PC) 80, a printer 90, a local storage device 100 and a medium drive 110, and may be part of a home computer system, for example. In this example, user 72 independently connects to one of the ASPs 10–40 which provides the documents and services needed by the user 72. For example, the user 72 may connect to ASP 30 via the Internet 50 and download documents for viewing on the screen of the PC 80, printing with printer 90, or storing in the local storage device 100 and/or medium drive 110. Where different services are required, the user 72 may have to access a different ASP.

In the conventional system of FIG. 1, the user 72 must search the Internet 50 for the ASP pertaining to the subject matter and services needed by the user 72. While users of ASPs may be knowledgeable professionals such as attorneys and doctors, they may have limited experience and knowledge in searching for and selecting the ASP to meet their needs. Moreover, once the user selects an ASP, the ASP may not be compatible with the user 72. For example the interface environment, such as a graphical user interface, may be unfamiliar or unrecognizable to the user, and documents provided by the ASP may be in a format unrecognizable to the user 72. In this regard, user 72 may have particular difficulty in using multiple ASPs such as the ASPs 10–40. Even, where the user 72 is compatible with many ASPs, accessing and searching the ASPs individually is time consuming and costly due to different procedures and features associated with each ASP 10–40.

One common use of ASPs is for storing and retrieving documents. For example, user 72 may want to store business documents as electronic files in an ASP to save physical and electronic storage space local to the user 72. These business documents can be retrieved by the user 72 by accessing the storage ASP at any time. Moreover, user 72 can obtain large documents such as reference documents and books from a document retrieval ASP as needed. These storage and retrieval ASP services create a further problem in that voluminous documents must be transmitted between the user 72 and the ASP 10–40 via the user's network connection which has a limited data transfer capacity. This may lead to the communication line between the user 72 and the ASP 10–40 being busy during extended transmission period times.

SUMMARY OF THE INVENTION

An object of the present invention is to provide a system, method and computer program product for allowing voluminous documents to be transferred between a user and an ASP with minimal disruption to the user.

Another object of the present invention is to provide a system, method, and computer program product for allowing users to store voluminous documents to an ASP.

These and other objects of the present invention are achieved by providing a novel method, system and computer program product for managing ASP documents.

According to one aspect of the present invention, a system, computer program product, and method for managing ASP documents are provided. The method on which the system and computer program product are based includes requesting a transfer of an ASP document at an ASP user device connected to a remote document manager and a remote ASP via a network such as the Internet, establishing a predetermined time for effecting a transfer of the ASP document, and transferring the ASP document at a predetermined time via the network. According to one embodiment of the first aspect, the step of requesting a transfer may include sending a deferred transfer request to the remote document manager via the network when the ASP user device logs on to the remote document manager. In this regard, the user requests a transfer by inputting a deferred transfer option from a menu received from the remote document manager via the network. The step of establishing a predetermined time for effecting a transfer of the ASP document may include inputting the predetermined time, and sending the predetermined time to the remote document manager via the network or requesting the remote document manager to establish the predetermined time without sending a predetermined time to the remote document manager.

In another aspect of the present invention, the method on which the system and computer program product are based may further include determining whether the ASP document is a storage document for storing in the remote ASP or a retrieval document for retrieving from the remote ASP. This determination may include determining that the ASP document is a storage document or determining that the ASP document is a retrieval document based on an operator input to the ASP user device. Where it is determined that the ASP document is a storage document, the method further includes inputting the storage document into the ASP user device, and transferring the ASP document via the network at the predetermined time. The ASP document may be input into the ASP user device by optically scanning a paper copy of the ASP document to provide a digital signal representative of the paper copy of the ASP document, and storing the digital signal in a memory associated with the ASP user device. Alternatively, the ASP document may be input by downloading an electronic copy of the ASP document from an external source to a memory associated with the ASP user device. In addition, a storage operation report may be received from the remote document manager at the ASP user device, and at which time the ASP document may be erased from a memory of the ASP user.

Where the ASP document is a retrieval document, the method includes generating a document retrieval request in the ASP user device, sending the document retrieval request to the remote document manager via the network, and receiving the retrieval document at the predetermined time. The retrieval document can be received from either the ASP or the remote document manager. The method may also include generating a document retrieval result report, and sending the document retrieval result report to the remote document manager and/or the remote ASP via the network.

BRIEF DESCRIPTION OF THE DRAWINGS

FIGS. 5A, 5B, and 5C depict data structures used for implementing a system for managing documents and selecting ASPs according to one embodiment of the present invention;

FIGS. 11A, 11B, 11C, and 11D illustrate a multifunction document processing center used in accordance with an embodiment of the present invention;

DESCRIPTION OF THE PREFERRED EMBODIMENTS

Figure 1:
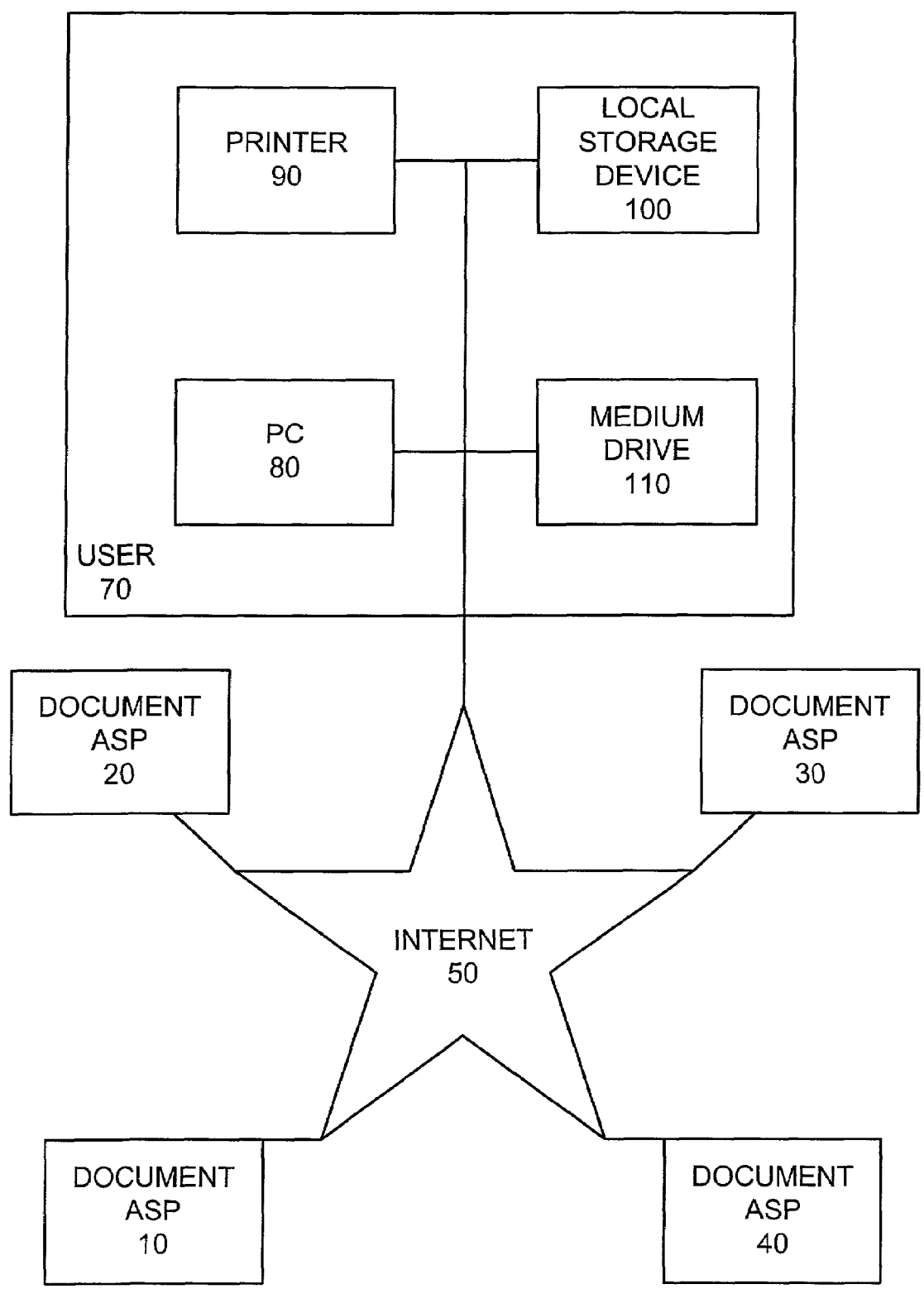
FIG. 1 is a block diagram showing a conventional ASP/user network.
Figure 2:
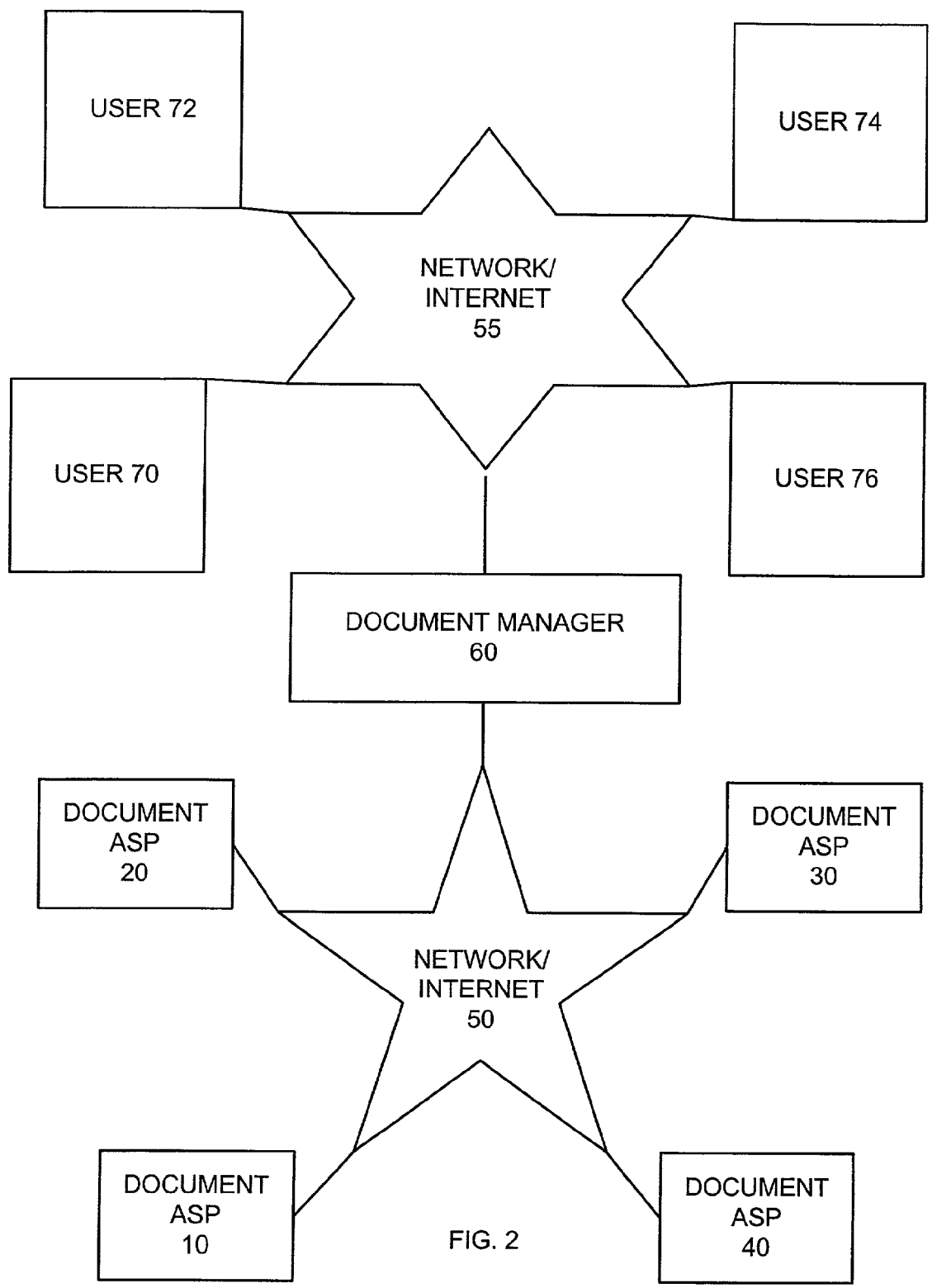
FIG. 2 is a block diagram showing an overall system configuration for managing documents according to an embodiment of the present invention.

Referring now to the drawings, wherein like reference numerals designate identical or corresponding parts throughout the several views, FIG. 2 is a block diagram showing an overall system configuration for managing documents according to an embodiment of the present invention. The system includes a network 50 a plurality of ASPs 10, 20, 20, 40, a document manager 60, a network 55, a plurality of users 70, 72, 74 and 76. The users 70–76 are interconnected by the network 55, and the ASPs 10–40 are similarly interconnected by network 50. Network 55 is connected to network 50 by way of the document manager 60, although these networks may be connected directly to each other, and may be parts of a single network such as the Internet. Thus, the users 70–76 and ASPs 10–40 are remote with respect to the document manager 60. Each user 70–76 may be a personal computer system such as the one shown as user 70 in FIG. 1, or may be implemented as the general purpose computer system shown in FIG. 15. Alternatively, users 70–76 may be a facsimile machine, digital copier, scanner, hand held device, or any known device for processing and communicating data via a network. In addition or alternatively, users 70–76 may be implemented as a multifunction document processing center such as the one shown in FIGS. 11A–11D, or a document storage device such as the Ricoh eCabinet™. ASPs 10–40 are computer systems for remotely providing any of a variety of services via a communications network. The ASPs 10–40 may also be implemented as a general purpose computer such as the computer system 1500 of FIG. 15.

The networks 50 and 55 are preferably the Internet, but can also be a local area network, a wide area network, any type of network such as an intranet, an extranet, or a combination thereof. An extranet may be used to provide controlled access to external users, for example through the Internet. How the users 70 and the document manager 60 can be connected to the Internet 50 and 55 is well-known in the art and is explained for example, in part 38 of "How Computers Work", by Ron White, Que Corporation, pps. 340–349, September, 1999, ISBN: 0-7897-2112-0, the entire content of this book being incorporated by reference. Other communications links for networks 50 and 55, such as a virtual private network, or a wireless link, may be used as well. Thus, FIG. 2 shows a system for accessing multiple ASPs through a document manager that provides a common interface to users of the ASPs.

Figure 3:
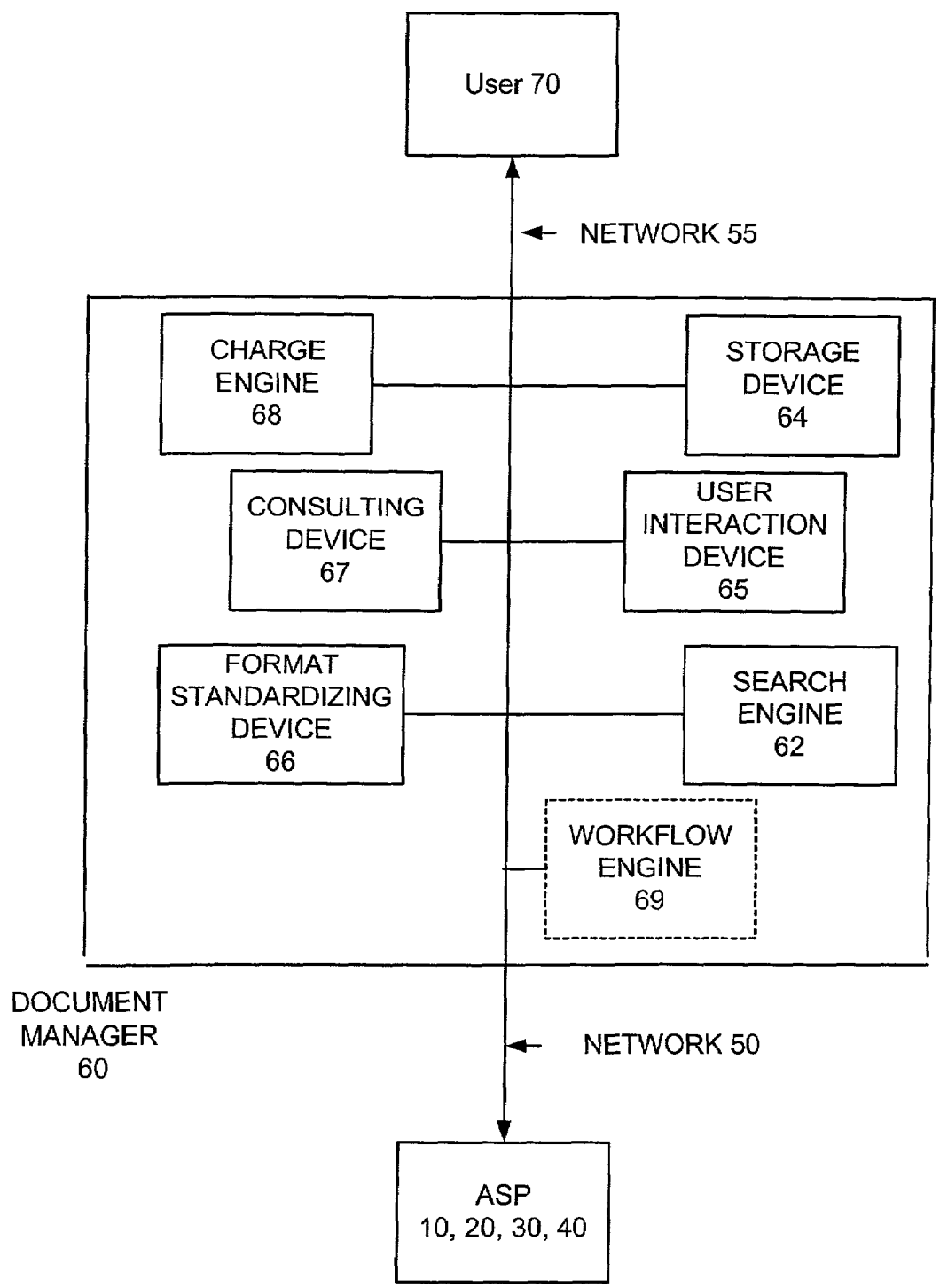
FIG. 3 is a block diagram illustrating a document manager in more detail according to one embodiment of the present invention.

FIG. 3 is a block diagram illustrating the document manager 60 in more detail according to an embodiment of the present invention. As seen in this figure, the document manager 60 connects an exemplary user 70 to ASPs 10–40 by way of networks 50 and 55. The user 70 may be implemented as any device for processing and communicating data via a network including computer system 1500 of FIG. 15. The document manager 60 includes search engine 62, storage device 64, user interaction device 65, format standardizing device 66, consulting device 67, and charge engine 68, as well as a work flow engine 69 shown on phantom. The work flow engine is an optional element used for issuing instructions to an establishing alliances among multiple ASPs as will be discussed with respect to FIG. 8.

In the embodiment shown in FIG. 3, user 70 interacts (exchanges data) with the document manager 60 via the user interaction device 65, so as to benefit from a number of services provided by the document manager 60. Based on data inputted from the user 70 and received by the user interaction device 65, the document manager 60 can provide consulting services via the consulting device 67 to the user 70 regarding document management in general. For example, consulting device 67 can be configured to provide advice to user 70 on topics such as document search strategies, document retrieval costs, document storage organization, updating documents, protection of secured documents, delivery options of documents, etc. In a preferred embodiment, consulting device 67 automatically provides advice to user 70 based on data inputted by user 70 via user interaction device 65. For example, the consulting device 67 may be programmed to ask a series of questions to the user 70, and to provide the user with a search strategy or storage strategy based on the user's answers. The questions asked by the consulting device 67 can be predetermined generic questions presented to any user, or personalized questions generated by the consulting device 67 based on previously acquired data from the user 70.

The user interaction device 65 also provides registration and other interface functions for the user 70. In one embodiment, the user 70 may access document manager 60 by signing on, for example using a user-name and a password, which can be verified by user interaction device 65. If the user is not a registered user, the user interaction device 65 can request information such as a name, e-mail address, postal address, a telephone number and/or billing information from the user so as to generate a membership or registration information. The user interaction device 65 may also receive the input data from the user 70 regarding the type of documents the user is requesting. For example, the user may input a requested document format, such as e-mail addresses, postal addresses, telephone numbers, or information about the type of document management needed by the user 70. The user interaction device 65 can request more information from the user and/or provide the user 70 with document managing advice, strategies, and information, for example, by way of the consulting device 67. In one embodiment, the user interaction device 65 also provides the user with the ASP addresses identifying where requested documents are available, or transmits the requested documents to the user 70, along with a unified bill as will be described below.

The document manager 60 also includes a search engine 62 configured to search and access ASPs based on data input from the user 70, the search engine 62 is also configured to retrieve documents. Thus, in the embodiment of FIG. 3, the user 70 need only input information related to the document or service required without regard to the ASP from which the desired document is to be retrieved. The search engine 62 may also be configured to search the individual ASPs for documents when the ASPs do not have a search engine available. Search engines are well-known in the art and are explained for example, in part 32 of "How The Internet Works", by Preston Gralla, Que Corporation, pps. 185–189, August 1999, ISBN: 0-7897-2132-5, the entire content of this book being incorporated by reference.

The document manager 60 also includes a storage device 64 for storing the documents requested by the user 70 in their original formats and/or in a standardized format. The storage device 64 may also include the URLs of the ASPs from which a document was retrieved, and/or the billing information from each ASP from which the search engine 62 retrieved documents. The storage device 64 may store user information, such as user-names, user passwords, e-mail addresses, postal addresses, telephone numbers, current and prior type of documents requested, current and prior document management strategies for specific users, current and prior user-requested searches, and/or searching parameters. In one embodiment, the storage device 64 is accessible by the user, for example via the user interaction device 65.

The storage device 64 can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions and/or data. Moreover, the storage device 64 may include a database, i.e., a digital repository, that may be implemented, for example, through a commercially available relational database management system (RDBMS) based on the structured query language (SQL) such as ORACLE, SYBASE, INFORMIX, or MICROSOFT ACCESS, through an object-oriented database management system (ODBMS), or through custom database management software.

The document manager 60 also includes a format standardizing device 66 configured to standardize the formats of the documents retrieved from various ASPs. For example, the format standardizing device 66 can re-format the documents so that they may be accessed using a single GUI. Such re-formatting devices are well-known in the art, and one exemplary format may be the PDF Acrobat formal, by Adobe. In one embodiment, the format standardizing device 66 receives the standard format from the user interaction device 65 and stores the standardized documents in the storage device 64. The documents to be formatted by the format standardizing device 66 can be received from the ASPs via network 50, from the user 70 via the network 55, from the storage device 64, or from the user interaction device 65.

The document manager 60 may also include a charge engine 68 configured to charge the user 70 with a unified bill. For example, the unified bill can correspond to the sum of the bills received from the ASPs. The bills from the ASPs can be received from the ASPs or the user interaction device 65, and can be forwarded to the user interaction device 65, or to the storage device 64 for storing, or to the user 70 via network 55.

The document manager 60 described above can provide consulting advice to the user, generate document managing strategies for the user based on the user's specific needs, retrieve and organize the addresses of, and links to, ASPs 10–40, retrieve documents from the ASPs 10–40, store the documents, format the documents, bill the user a unified bill, and/or transmit the documents to the user to be viewed, printed, or stored. The document manager 60 thus provides the user with access to ASP services, the ability to retrieve from ASPs, a consistent user interface, a single sign-on service, the ability to request a single search for different documents and different document types, a single billing service, and a flexible storage service. The document manager 60 may also suggest to the user and provide the user with online print and delivery services, for example by ordering documents from the ASPs and securing their delivery to the user via a courier. In this embodiment, the document manager 60 can contract with the ASPs and the courier service to ensure proper delivery, to be the user's agent that keeps track of the delivery, and to inform the user of the status of the delivery. The document manager 60 can also generate a single bill for its services and those of the ASP and courier used.

The document manager 60 also provide the user 70 with the links to the ASP documents so that the user may access the documents via the document manager 60 without having to store any document at the computer of the user, nor at the document manager 60, if desired. In this respect, the user 70 benefits from the searching, retrieving and storing known-how of the ASPs. In this embodiment, the ASP can charge a fee for access to their documents. In one embodiment, the fee may be incorporated into a unified bill generated by the document manager 60 and provided to the user 70 for its benefit. The term "unified bill" herein means a bill that includes the charges of at least two bills, or alternatively includes the charges from at least two different entities.

Furthermore, the document manager 60 permits the user to retrieve documents and to store the documents on a local storage device, either permanently or temporarily. Alternatively, the document manager allows the user 70 to store a document at the ASP. For example, the document manager 60 may be in a partnership with the ASPs to provide storage at the ASPs for documents of users, i.e. customers, of the document manager 60. For instance, a user may decide to store sensitive legal documents, insurance contracts, or digital certificates on a local storage device for a predetermined period of time, and have the documents protected from loss, theft, fire, disaster, etc. by storing them at an ASP, which may provide better protection for the secured documents. In this case, the user benefits from the ASP's know-how for handling and protecting secured documents. In this embodiment, the ASP can charge a fee for the storage. In one embodiment, such a fee would be included in a unified bill computed by the document manager for the benefit of the user.

Advantageously, the user does not have to be aware of the different ASPs used by the documents manager 60 to create the collection of documents retrieved and transmitted to the user, and used to store documents at the ASPs. Therefore, the user may deal with a single user interface when receiving the requested documents and when transmitting the user documents to be stored at the ASPS. In addition, the unified billed, generated by the ASPs for either searching, delivering, or storing documents, provided by the document manager 60 also alleviates the burden on the user 70 to pay several different bills.

The document manager 60 thus provides a single stop for consulting, billing, formatting, obtaining, reviewing, storing, and managing a variety of types of documents, such as legal, financial, insurance, engineering, accounting, or general office, educational, medical, governmental agencies documents. It is to be understood that the above-described configuration of the document manager 60 is exemplary only, as many variations of the specific hardware and software used to implement the present invention will be readily apparent to one having ordinary skill in the art. To implement such variations, general purpose computer such as computer system 1500 of FIG. 15 may be programmed to perform the special purpose functions of any or all of items 62–69 of the document manager 60 of FIG. 3. Moreover, principles and advantages of distributed processing such as redundancy and replication, may be implemented as desired to increase the robustness and performance of the system of FIGS. 2 and 3, for example.

Figure 4:
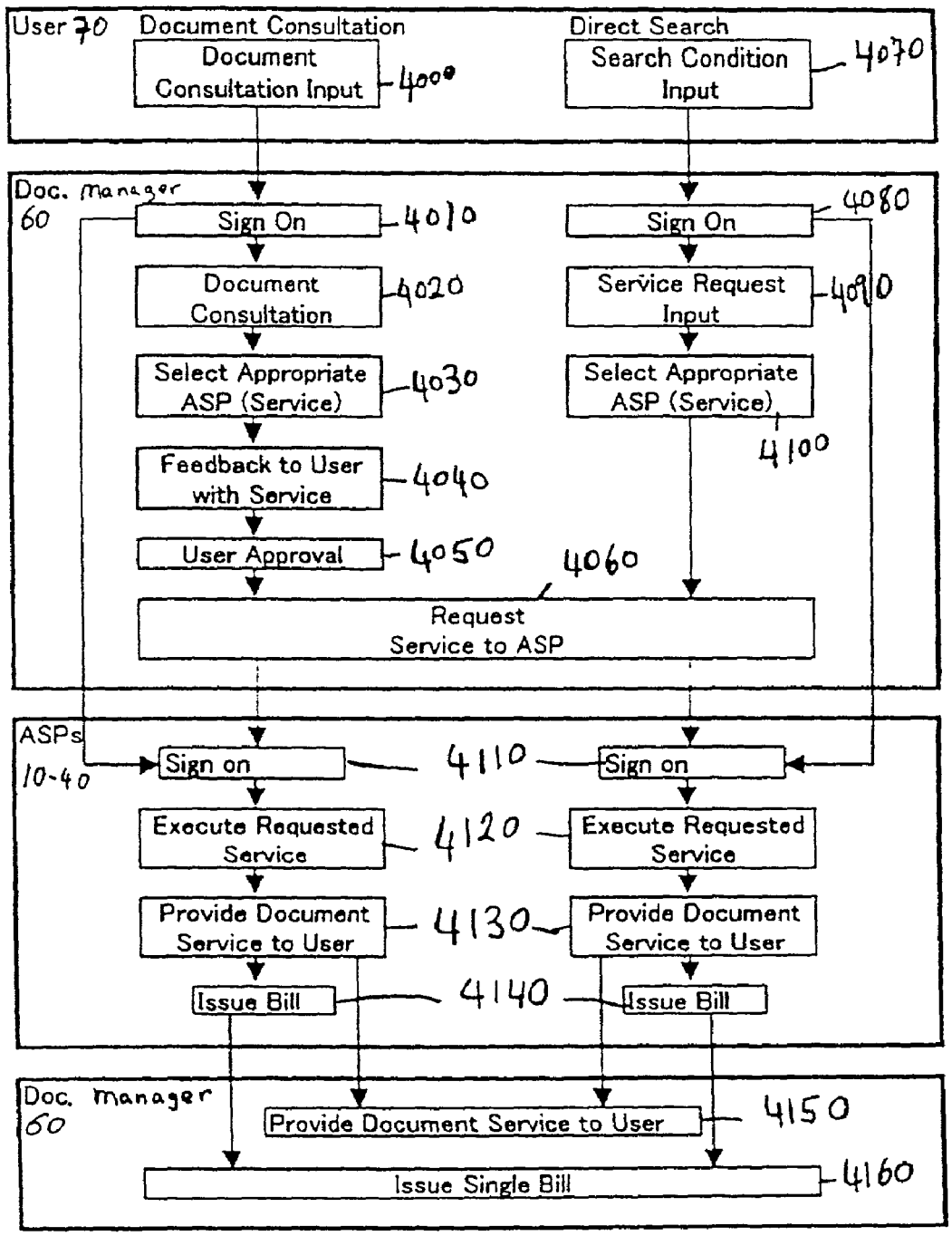
FIG. 4 is a flowchart illustrating the functionality of a document management system according to one embodiment of the present invention.

FIG. 4 is a flowchart showing the functionality of the document management system according to one embodiment of the present invention. As shown in the embodiment of FIG. 4, document manager 60 offers user 70 at least two types of services: as illustrated on the left of the diagram, the user 70 can access the document manager 60 for document consultation, and as illustrated on the right the user 70 can access the document manager 60 for a direct search. For the document consultation service, the user 70 inputs data related to the type of document consultation requested at step 4000, for example, the type, number, format of documents needed, the budget available for the service, the time constraints for completing the service, the level of security required, etc. At step 4010, the user 70 signs on the document manager 60, for example by providing a user-name and password. Once the user is signed on, the document manager 60 performs a document consultation at step 4020, for example, with the consulting device 67, which can generate a strategy for the service requested based on the inputted information from the user 70, or by asking further questions. Based on the document consultation, the document manager 60 selects the ASPs appropriate for the service requested by the user 70 at step 4030. The document manager 60 sends the user 70 feedback on the selection of the ASPs, at step 4040 for example indicating the costs and time of the service. Upon approval from the user 70 at step 4050, the document manager 60 requests the service from the ASPs at step 4060.

For the direct search service, the user 60 can input the search requested at step 4070. At step 4080 the user signs on the document manager and the user request is inputted at step 4090. The document manager 60 then selects the ASPs appropriate for the requested service at step 4100 and requests the service from the ASPs at step 4060.

For both services, the document manager signs on to the ASP to request the service at step 4110. In other words, if the user signs on the document manager 60, the user can access several ASPs without signing on each ASP. Once the ASPs receive the requested service, the ASPs perform (execute) the service at step 4120, for example, search for a specific document, provide the document to the user at step 4130 and bills the document manager 60 at step 4140. The document manager 60 then provides the document(s) to the user 70 at step 4150 and issue a single bill to the user for all services performed at step 4160. Also, for both services, the user 70 has the option of signing-on the document manager 60 at step 4010 and 4080 and the ASPs 10–40 at step 4110 and placing the request. This may be beneficial when the user knows which ASP can provide the desired service. In this case, the document manager 60 can still perform the services of issuing a single bill, or reformatting the documents in accordance to the user's requested format, and/or securing the proper delivery of the document to the user, etc.

As mentioned above, the document manager 60 may select an appropriate ASP for the ASP transaction or service requested by the user. According to one embodiment of the present invention, the document manager 70 selects an ASP based on document profile created by the user 70 in previous interactions with the document manager 60. In this embodiment, the document manager may also select an ASP based on a document consultation input and a transaction or service requested by the user 70. FIGS. 5A, 5B, and SC depict data structures for implementing a system for managing documents and selecting an ASP in accordance with the embodiment of the present invention. The data structures are preferably in relational format, using tables, whereby information stored in one column (i.e., field) of a table is mapped or linked to information stored in the same row (i.e., record) across the other column (s) of the table, although any other format or relationship could be used. These data structures are used by the document manager 60 and/or the user 70 to manage documents in accordance with the present invention. According to a preferred embodiment, the data structures 5A, 5B, and 5C are stored in storage device 64 of document manager 60. However, any one or all of data structures 5A, 5B, and 5C may be stored in a storage device of the user 70, or any other suitable storage device remote to either or both the user 70 and document manager 60.

FIG. 5A is a document profile table 501 that includes a field 503 for storing a user ID, a field 505 for storing document profile names associated with the user ID in field 503, and a field 507 for storing industrial categories associated with each document profile name stored in field 505. The user ID in field 503 is a unique identifier associated with the user 70 and the document profile name in field 505 is a name assigned by the user 70 to identify a particular type of document for which the user 70 commonly requires the services of an ASP. In a preferred embodiment, an operator of user 70 chooses a user ID during an initial registration process with the document manager 60, and assigns profile names to common document transactions subsequently performed with the document manager 60. The industrial category field 507 includes industrial categories used to identify certain ASP services used for the user's ASP transaction and to select at least one ASP appropriate for performing the user's ASP transaction. These services and selected ASPs are stored in a separate data structure which will be described below with respect to FIG. 5B.

To illustrate the use of a document profile table 501, FIG. 5A includes two exemplary entries of different users and the profile names and industrial categories associated with each user. The first entry of FIG. 5A shows that field 503 may contain the number "071870" as a user ID, and in the same record, field 505 may contain the entries "invoices", "employee benefits", and "service contracts" as corresponding document profile names. In addition, the industrial category field 507 includes the entries "accounting," "insurance", and "legal" as industrial categories associated with the invoices, employee benefits, and service contracts of field 505. Thus, the first entry of table 501 provides an example of a business entity that uses the document manager 60 as a tool for managing documents related to the business and its employees. The second entry of document profile name table 501 includes user ID "090269" in field 503, and the corresponding entries "grocery bills", and "general" in fields 505 and 507 respectively and therefore is likely to correspond to a home user. Thus, the document profile table 501 associates each of a number of user IDs with corresponding document profile names and industrial categories associated with each profile name. While it is possible to have only one industrial category associated with each profile name, it is also possible to have two or more industrial categories associated with a profile name.

FIG. 5B is an industrial category table 510 that includes a field 511 for storing industrial categories, fields 513–533 for storing a plurality of service functions associated with each industrial category, and a field 535 for storing a selected ASP. The industrial category in field 511 is a subject matter description by which ASP documents and services may be categorized. When a document consultation is conducted with the user to create a document profile as will be discussed below. The service functions in Fields 513–533 are various general services typically offered by ASPs as will also be further described below. As seen in FIG. 5B, certain service functions are flagged as "necessary" in table 510 indicating that the flagged service function is required for an associated industrial category in field 511. Thus, each industrial category in field 511 is associated with a number of service functions used for ASP transactions that fall within the industrial category. In actual implementation, the fields 513–533 may be implemented using flags or True/False indicators, as filed in conventional databases. The selected ASP in field 535 identifies an ASP that provides all of the service functions required for the industrial category. Thus, as seen in the first entry of FIG. 5B, an ASP which manages real estate documents should have the service functions of Access Level Control, Internet Security, Collaboration, and Image Input, and ASP 6 provides these functions. In one embodiment of the present invention, if the user does not need specific security functions, the document manager 60 provides a "General" category where the user can select an appropriate ASP from among plural ASPs provided as shown by the last entry of table 510 in FIG. 5B.

As indicated above, the service functions of fields 513–535 are services typically provided by an ASP. The Encryption service of field 513 allows documents to be stored on a server with encryption using a digital certificate from a third party Certificate Authority, for example. Encrypted documents can only be decrypted by applying the designated key pair held by the owner of the documents. The Access level control service of field 515 requires the user to have a predetermined access level before retrieving a document. The concept of the access level of a document is described in detail in U.S. patent application Ser. No. 09/684,965, entitled METHOD AND SYSTEM OF DOCUMENT MANAGEMENT BY USING DOCUMENT AGENT, which is incorporated herein by reference. Briefly, the access levels identify the documents which a specific user (or operator) can access at the ASPs via the document manager 60. The user 70 (and similarly users 72, 74 and 76) may assign an access level to each document stored at the ASP. During a document retrieval operation, the user's ID is transmitted to the document manager 60 and the document manager 60 retrieves documents that match the user's access level. As a result, security management can be accomplished and the search time can be reduced. The access level for each user can be stored in the document manager 60 or at the user 70. When documents are stored in the ASPs, the access level can be set with each document. Alternatively, the access level for each stored document can also be stored at the ASPs. When the document manager 60 executes a document retrieval operation, the document manager's search engine and/or the ASPs' search engine execute the retrieval operation only for documents having an access level matching the user's access level. Consequently, the retrieval time is shortened and high security documents can be accessed by only appropriate users.

As to the remaining service features in the industrial category table 510, the Physical Storage feature of field 517 provides a physical security service which includes establishment of data center in a secured environment. The Security Policy service of field 519 provides a written security policy which is required in some industries when storing documents off-site. The Internet Security service of field 521 requires that all users be authenticated to access document with optional digital certificate capability, and that all data transmission is done through a Secure Sockets Layer (SSL). The Off-Site Backup service of field 523 provides backup tapes or other media stored in a safe place remote from the primary data center of the ASP. The Audit service of field 525 logs user activities. The Collaboration service of field 527 allows users to jointly edit a document and tracks the edit history. The collaboration service allows users to check in/check out a document. The Workflow Transmission service of field 529 provides a Document Delivery feature that gives the user the ability to deliver a document within a workgroup and to store a workflow profile. The Archiving service of field 531 stores a document and creates a backup of the document. The Image Input service of field 533 allows users to upload images from digital cameras and other devices to the ASP and/or the ability to scan documents from a scanning device such as a Ricoh MFP and to store the images directly at the ASP site.

Thus, the industrial category table 510 associates industrial categories with a plurality of service functions used with the industrial category, and a selected ASP which provides the required functions. It is to be understood that the service functions of fields 513 through 533 are exemplary only and that any desired service functions may be input in table 510 as a condition for identifying selected ASPs. Moreover, the "necessary" conditions or flags shown in FIG. 5B are stored in the storage device 64 as a default condition. In a preferred embodiment, the user 70 and or document manager 60 can modify the conditions if necessary. In this embodiment, the consulting device 67 of the document manager 60 automatically selects an ASP which is appropriate to the modified condition.

In addition to the storage and retrieval transactions typically provided by ASPs, certain ASPs may provide special transactions and/or services not provided by the typical ASP. FIG. 5C is a special service table 550 that includes a field 551 for storing special services that may be provided by an ASP, and a field 553 for storing ASP(s) that provide each special service. As shown in FIG. 5C, field 551 of the special services table 550 includes a print and delivery service and a digital signature service. Field 553 indicates that ASP 1 and ASP 7 provide the print and delivery, and digital signature services respectively. As with the service functions of table 510, the special services in field 551 are exemplary only and may be added to or modified as needed. Moreover, while the special service table 550 of FIG. 5C associates a single ASP to a special service, it is to be understood that multiple ASPs may be listed in field 553 and/or be associated with a special service.

Figure 6:
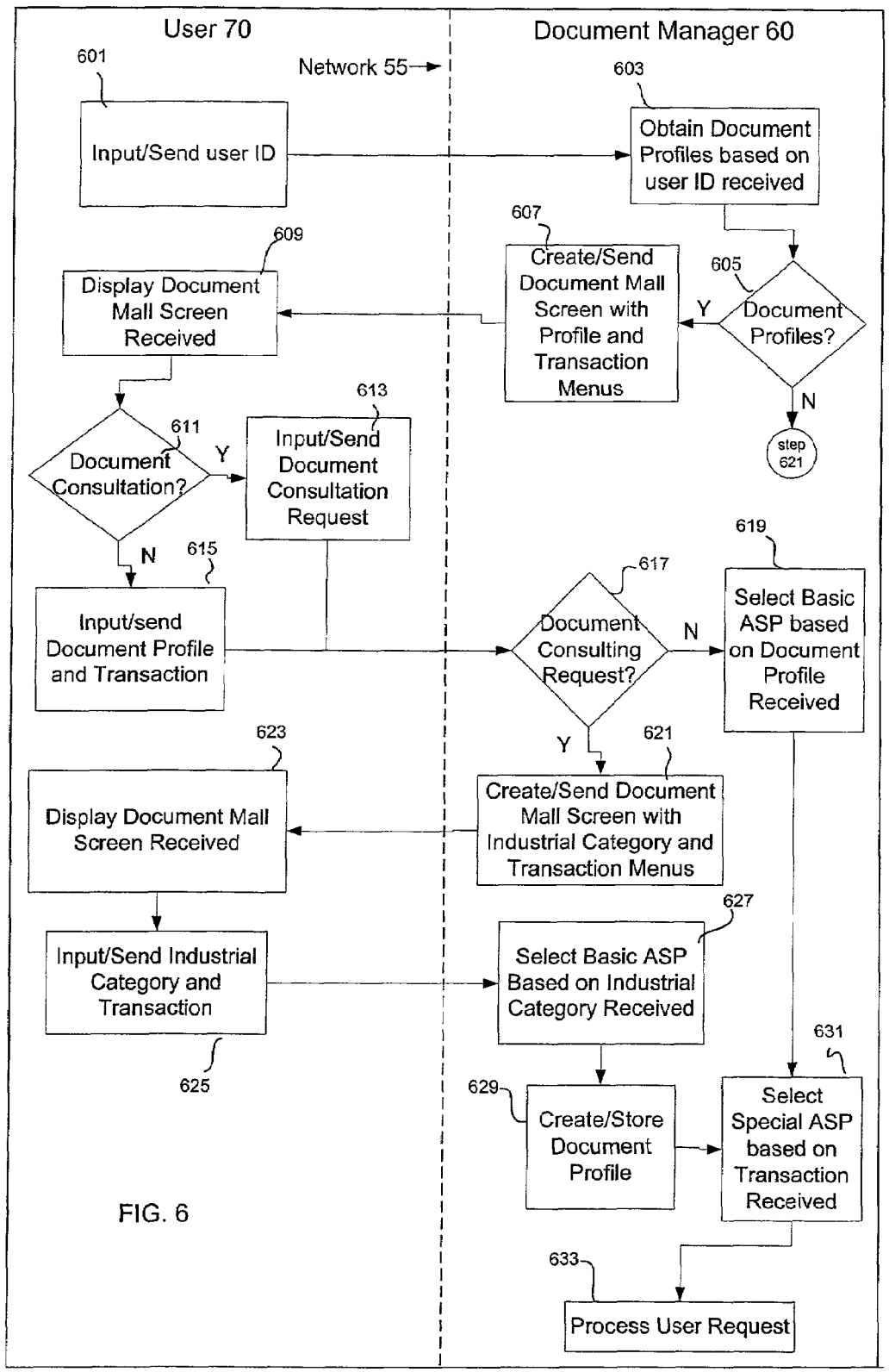
FIGS. 6 is a flowchart showing the role of the user and ASP in the process of selecting an appropriate ASP according to one embodiment of the present invention.

As mentioned above, the document manager 60 may select the appropriate ASP(s) for providing the user 70 with the required service functions and selected special services. FIG. 6 is a flowchart showing the process for selecting an ASP according to one embodiment of the present invention. The flowchart of FIG. 6 is in a relational format which shows the processing steps performed by the user 70 and the document manager 60. The process steps performed by these devices are separated by a vertical dashed line indicating the network 55. Thus, arrows that cross the dashed line indicate data transfer between the user 70 and document manager 60 via network 55.

In step 601, a user ID is input to the user 70 and sent to the document manager 60. The user ID may be input as part of a login or registration process as previously described, or in response to a request from the document manager 60 after the user has logged on the document manager 60. In step 603, the document manager 60 obtains document profiles associated with the user ID received from the user 70. In this step, the document manager 60 accesses the document profile table 501 in storage device 64 and searches the user ID field 503 for the user ID received. Once the user ID is located, the document manager 60 reads all document profile names associated with the user ID from field 505 of the document profile table 501. As seen in decision block 605, if the user ID received is not within the document profile table, or there are no document profile names associated with the user ID, then the document manager 60 proceeds to step 621 to initiate creation of a document profile as will be discussed below.

Where document profiles are stored for the user ID received, then in step 607 the document manager 60 creates a document mall screen including a document profile menu with the document profile names obtained in step 603, and a transaction menu retrieved from the storage device 64. As an example of how the document manager 60 obtains document profiles for the document mall screen, if the user ID received in step 603 is "071870" the document manager 60 locates this user ID in the first entry of the document profile table 501 and reads the profile names "Invoices", "Employee Benefits", and "Service Contracts" from field 505 of the table. These document profile names are then used in step 607 to create the document mall screen that is transmitted to the user 70. The document mall screen including the document profile menu and ASP transaction menu may be downloaded to the user 70 under the control of the consulting device 67 of the document manager 70, for example.

Figure 7A:
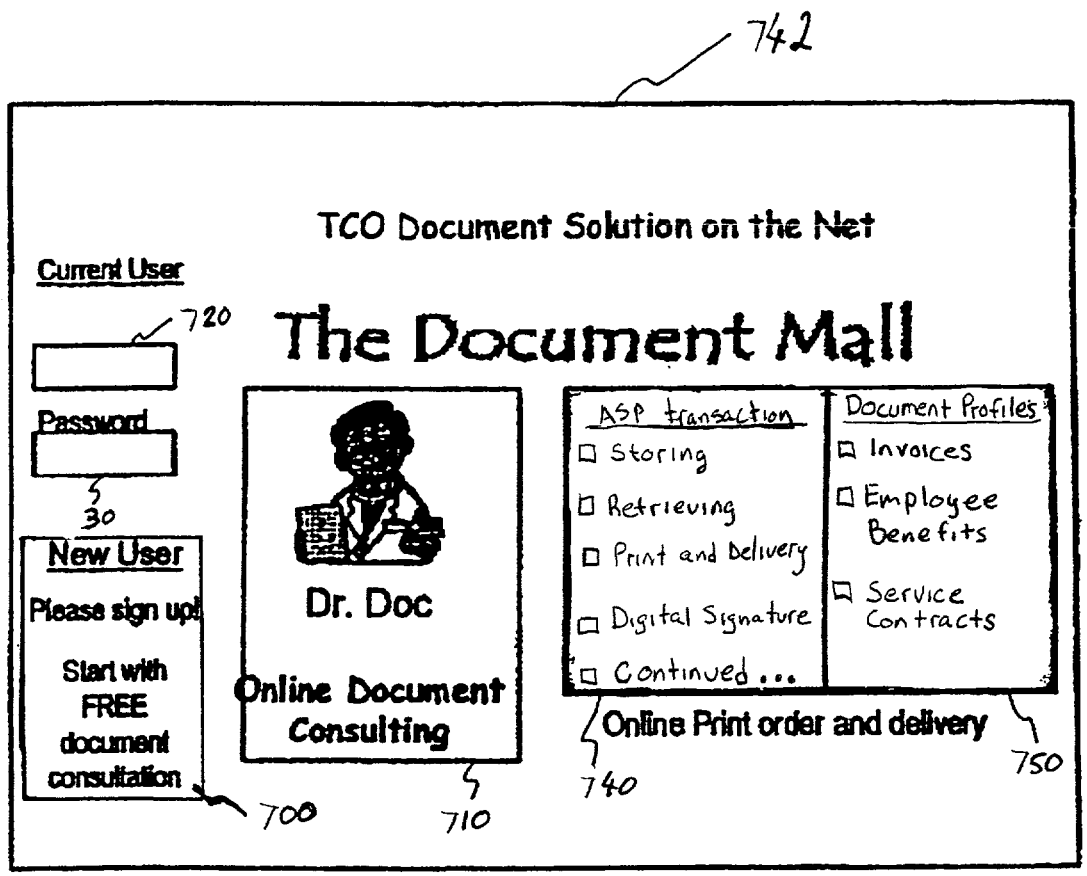
FIGS. 7A and 7B illustrate document mall screens displayed on the user computer according to one embodiment of the present invention.

In step 609, the user 70 displays the document mall screen received from the document manager 70. FIG. 7A shows an example of a document mall screen displayed on the user 70 in step 609 in accordance with an embodiment of the present invention. The document mall screen 742 is displayed on a display of the user 70 and allows an operator of the user 70 to interact with the document manager 60. The document mall screen 742 has one or a plurality of message areas, such as message area 700 which informs the operator of various options or requirements, such as the requirement to sign up if the operator (or "user") is new, or offering the option to start with a free document consultation. The document mall screen 742 has one or a plurality of selection buttons, such as selection button 710, which may be selected to start an online document consulting session provided by document manager 60. The document mall screen 742 also has one or a plurality of interactive areas, such as interactive areas 720, 730, 740 and 750. Interactive areas 720 and 730 allow the operator to enter a user I.D. and a user password, respectively. Interactive area 740 includes the transaction menu delivered from the document manager 60 in step 607, and interactive area 550 includes the document profile menu delivered from the document manager 60 in step 607.

In one embodiment of the present invention, all or a portion of the document mall screen 742 may be saved in a memory of user 70. For example, user 70 may display the document mall screen 742 including message area 700, selection button 710 and interactive areas 720, 730, 740, and 750 so that the user can simultaneously send the document manager 70 a user ID as well as the transaction and document profile information needed to complete the user's request. Alternatively, in the embodiment of FIG. 6, the user 70 would display only the user ID area 20 and password area 30 initially, and subsequently fill in the other areas of the document mall screen after sending the user ID to the document manager 70. Moreover, while the screen of FIG. 7A is labeled "The Document Mall", it is to be understood that this is exemplary only and the aesthetics of the screen may be changed or customized for each user, or in any desired manner.

As seen in FIG. 7A, the document profile menu in area 750 includes the document profiles associated with the user 70. Returning to the example of user 071870, the document profile menu includes profile names "invoices", "Employee Benefits", and "Service Contracts." The ASP transaction menu in area 540 includes a list of ASP transactions or services that the user 70 can select from. The ASP transaction menu lists various transaction options typically offered by ASPs such as "Storing" and "Retrieving", and further lists special services such as "Print and Delivery" and "Digital Signature" offered by special service ASPs. As seen in interactive area 740 of FIG. 7A, the ASP transaction menu may include a "continued . . . " selection to allow the user to select or engage other ASP transactions on a continuation screen.

Returning to FIG. 6, after displaying the document mall screen 742 of FIG. 7A, the user 70 determines whether a document consultation is required based on the input from the operator of the user 70 as shown by decision block 611. If a document consultation is requested by the operator, the user 70 proceeds to step 613 where a document consultation request is input and sent to the document manager 60. However, where the operator does not require a document consultation, the user 70 proceeds to step 615. In step 615, the user 70 inputs a document profile and transaction based on the items selected by the operator from the document profile menu and ASP transaction menu. Selection from the document profile menu, the ASP transaction menu, or the document consulting selection button 710 may be accomplished, for example, by clicking a button on a mouse or remote control, pressing a key (or keys) on a keyboard or on the control panel, touching the display screen, speaking a command, etc. Where a menu includes a large number of selections that cannot be listed in a single viewing, the user may scroll to a second viewing by selecting a "continued . . . " option as noted above and shown in the ASP service menu in area 540. Whether or not a document consultation is requested, the information resulting from step 613 or 615 is then transmitted from the user 70 to the document manager 60 via network 55.

Figure 7B:
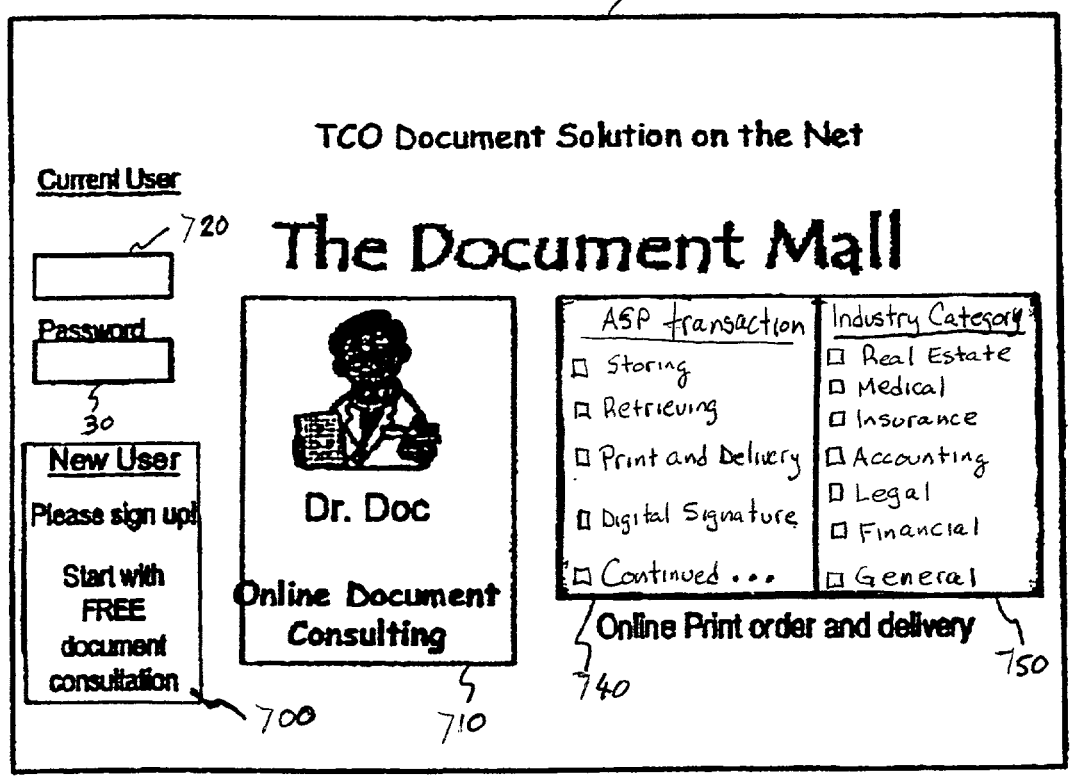

In step 617, the document manager 60 receives the information delivered from the user 70 and determines whether a document consulting request is included in the information received. Where no document consulting request was received, the document manager 60 determines that the information received includes a document profile and proceeds to step 619 where the basic ASP is selected based on the document profile received from the user 70. Specifically, as part of step 619, the document manager 60 searches field 505 of the document profile table 501 shown in FIG. 5A for the document profile name received from user 70, and obtains the industrial category associated with this profile name from field 507 of the document profile table 501. With the industrial category known, the document manager 70 then searches field 511 of the industrial category table 510 and selects the basic ASP associated with the known industrial category from field 535 of the document profile table 510. Thus, continuing with the example of the user 071870, if the user 70 inputs "Invoices" as the document profile name in step 615, the document manager 70 first identifies the industrial category as "accounting" from table 501, and then selects ASP3 from table 510 as the ASP appropriate for accounting documents. Thus, a basic ASP that provides typical ASP transactions and services may be selected using the document profile table 501 and industrial category table 510. In addition, after the basic ASP is selected in step 619, a special ASP is selected in step 631 as will be further described below.

Where the document manager 60 determines, in decision block 617, that the user 70 did request a document consultation, the document manager 60 proceeds to step 621 where a document mall screen including an industrial category menu and a transaction menu is created and sent to the user 70. In step 623, the user displays the document mall screen with the industrial category and ASP transaction menus. FIG. 7B shows an example of a document mall screen displayed on the user 70 in step 623 in accordance with an embodiment of the present invention. The document mall screen 742 in FIG. 7B is identical to the document mall screen 742 in FIG. 7A with the exception of interactive area 750 and therefore the discussion of FIG. 7B will be limited to this area. Interactive area 750 includes an industrial category menu which lists industrial categories for selection by the user 70. The industrial category menu serves as a request to the user to select a category that best describes the document that the user is obtaining ASP service for. As seen in FIG. 5B, the industrial category menu preferably includes all of the industrial categories included in the industrial category table 510. As discussed above with respect to FIG. 5B, the document manager 70 stores predetermined ASP service functions that are used with each industrial category and the ASPs that provides these service functions. The user 70 that has requested a document consultation in step 611, inputs an industrial category and ASP transactions selected by the operator of the user 70 and sends this information to the document manager 60 as shown by step 625.

In step 627, the document manager 60 selects a basic ASP based on the industrial category received from the user 70. Specifically, the document manager 70 searches field 511 of industrial category table 510 for the industrial category received from user 70, and selects the ASP associated with this industrial category from field 535 of table 510. In one embodiment of the present invention, the document manager 60 may also select a secondary basic ASP as a backup for the primary basic ASP. The secondary ASP may be used, for example, where the primary basic ASP is too busy to process the user's request or when the ASP cannot deliver or does not have the item which is desired. While step 627 describes selecting a basic ASP based on the industrial category input by a user that has requested a document consultation, it is to be understood that more information can be requested by the document manager 60 and/or provided by the user 70 as part of the document consultation process used for determining a basic ASP.

Where the document manager 60 selects a basic ASP based on the industrial category received from the user 70, the user 70 either does not have a document profile as determined in decision block 605 or has requested a document consultation in step 615 to create a new document profile, for example. In either situation, the document manager 60 creates and stores a document profile for the user as indicated by step 629. The document profile includes the user ID, profile name, and an industrial category as shown in the document profile table 501. In a preferred embodiment, the profile name is selected by the user as a convenient name to identify the document type which ASP services are needed for. In this embodiment, the user 70 sends the document profile name to the document manager for creating the document profile. In another embodiment, the document manager 60 may automatically assign a document profile name. It is also noted that the document profile includes the selected ASP related to the document profile name. However, this selected ASP is stored in the industrial category table 510 so that the necessary service functions can be conveniently changed by the user 70 or document manager 60 as needed.

In addition to selecting a basic ASP in either step 619 or 627, the document manager 60 selects a special service ASP based on the transaction menu selection received from the user 70 as shown in step 631. As discussed with respect to FIGS. 7A and 7B above, the document mall screen 742 includes an ASP transaction menu in interactive area 740. As seen in these figures, the ASP transaction menu includes typical ASP transactions such as "storing" and "receiving", as well as special services such as "print and delivery" and "digital signature" which, according to the present invention, may be independently provided by special service ASPs. Based on the users input to the ASP transaction menu, in step 631 the document manager 60 determines whether a special ASP is needed in addition to the basic ASP. While the ASP transaction menu of FIGS. 7A and 7B lists both general ASP services and special ASP services, an alternative embodiment of the present invention may provide separate special services menu delivered to user 70 on demand.

As part of step 631, the document manager 60 first determines whether a special service has been selected by user 70 from the ASP transaction menu. If a special service was selected, the document manager 60 accesses the special service table 550 and matches the special service received from the user with a special service listed in field 551 of the special service table 550. Once the special service requested by the user 70 is identified in the special service table 550, the document manager 60 obtains the ASP associated with the special service from field 553 and selects this ASP as one of the ASPs that will process the users request. For instance, if the user selects Print and Delivery service, the ASP1 is selected as the special ASP based on the control of the consulting device 67 of document manager 60. If the user selects both of Print and Delivery service and Digital Signature service, the ASP1 and ASP7 are selected as the additional ASPs. These special ASPs are selected in addition to basic ASP selected in step 619 or step 627. Where the user 70 did not input a special service in the transaction menu, the document manager does not select a special ASP in step 631 and proceeds to step 633.

With the basic ASP and the special service ASP selected, in step 631 the document manager 60 continues to process the users request with the identified ASPs. This step may proceed with connecting to the identified ASPs where the details of the service request are previously provided by the user 70, or with feedback to the user 70 to obtain further details such as a search query from the user 70, and/or confirmation of the ASPs selected.

As indicated above, the document manager 60 of the present invention may select multiple ASPs to process the user's request. According to one embodiment of the present invention, where multiple ASPs are selected by the document manager, the document manager 70 can store alliance relationships among the ASPs in the storage device 64. An alliance relationship allows the selected ASPs to communicate with each other to process the user request. Thus, the user receives the benefit of performing one search on multiple ASPs without the need of separately registering with each ASP. In this embodiment, the document manager 60 includes a workflow engine 69 as shown in phantom in FIG. 3. The workflow engine creates instructions for each ASP based on instructions stored in the storage device 64 of document manager 60. The workflow engine 69 reads the instructions from the storage device 64 and transmits the instructions to the selected ASPs via network 55. For instance, where the industrial category is Legal, and the user selects a Print and Delivery service and a Digital Signature service, the consulting device 67 selects ASP 2 for documents storing and document retrieving, ASP 1 for Print and Delivery and ASP 7 for Digital Signature.

Figure 8:
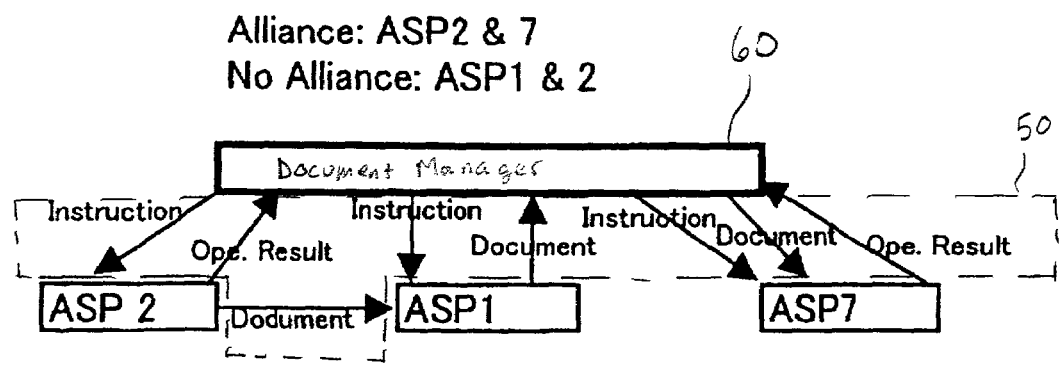
FIG. 8 describes an ASP alliance feature of the document manager according to one embodiment of the present invention.

FIG. 8 describes the ASP alliance feature of the present invention. This figure shows the exchange of information between the document manager 60 and ASPs 2, 1, and 7, as well as the exchange of data among ASPs 2 and 1. The dashed box of FIG. 8 represents the network 50 on which the data travels. In this example, the workflow engine 69 reads instructions from the storage device 64 and instructs ASP 1, ASP 2 and ASP 7 as follows:

For ASP 2: "Store a document transmitted from the document manager, then read out the stored document and transmit the stored document to the ASP 2, and report the operation result to the document manager."

For ASP 1: "Receive the document from the ASP 1, then execute digital signature on the received document, and transmit the signed document to the document manager."

For ASP 7: "Receive the document from the document manager, print out the received document, mail the printed document to the user, and report the operation result to the document manager."

Thus, in the example of FIG. 8, ASP2 and ASP1 are in alliance while ASP7 has not made an alliance. Therefore the document obtained from ASP2 is transmitted directly from ASP2 to ASP1 while this same document must be first delivered to the document manager 60 which forwards the document to ASP7 for print and delivery. The document manager transmits the above instructions to three ASPs simultaneously, and waits for the replies from the ASPS. Regarding the Print and Delivery service, since it may take at least one day to complete the service in a preferred embodiment, the ASP 7 estimates service completion date and informs the user through the user's e-mail of the estimated service completion date, and or the document manager 70.

In addition to the ASP alliance feature in one embodiment of the present invention, the document manager 60 also provides a unified keyword format for the user. When processing the user's request as in step 633 of FIG. 6, the document manager 60 may receive a database type query from the user 70. However, where multiple ASPs are selected, it is likely that each ASP has different input format for inputting information such as a date, wild card, keywords and so on. For instance, the date information may have to be inputted in mm-dd-yy format for ASP 1, while the same information has to be inputted in yyyymmdd format for ASP 2. Also, the wild card information may have to be indicated by using * for ASP 1, but the same information may be designated by $ for ASP 2. Further, a keyword phrase may be inputted as "intellectual property" for ASP 1, but the same phrase has to be inputted as intellectual & property for ASP 2. In order to realize a unified user interface, the document manager 60 provides unified input format for the user, and translates the unified format to different formats, which are utilized with the selected or desired ASPs. In this embodiment, the storing device 64 stores input formats of ASPs which can be controlled by the document manager 70. Also, the storing device 64 stores a unified input format, which is displayed on the user 70 display for the document mall operation. The user interaction device 65 translates the inputted date information, wild card information and/or keywords that are in a single or unified format to specific formats which are suitable for selected or desired ASPs and then transmits the translated formats to the selected ASPs. According to a preferred embodiment of the present invention, not only is the screen for inputting service requests unified, but also the other user interfaces are unified, even if plural ASPs are utilized to accomplish the user's request.

Figure 9:
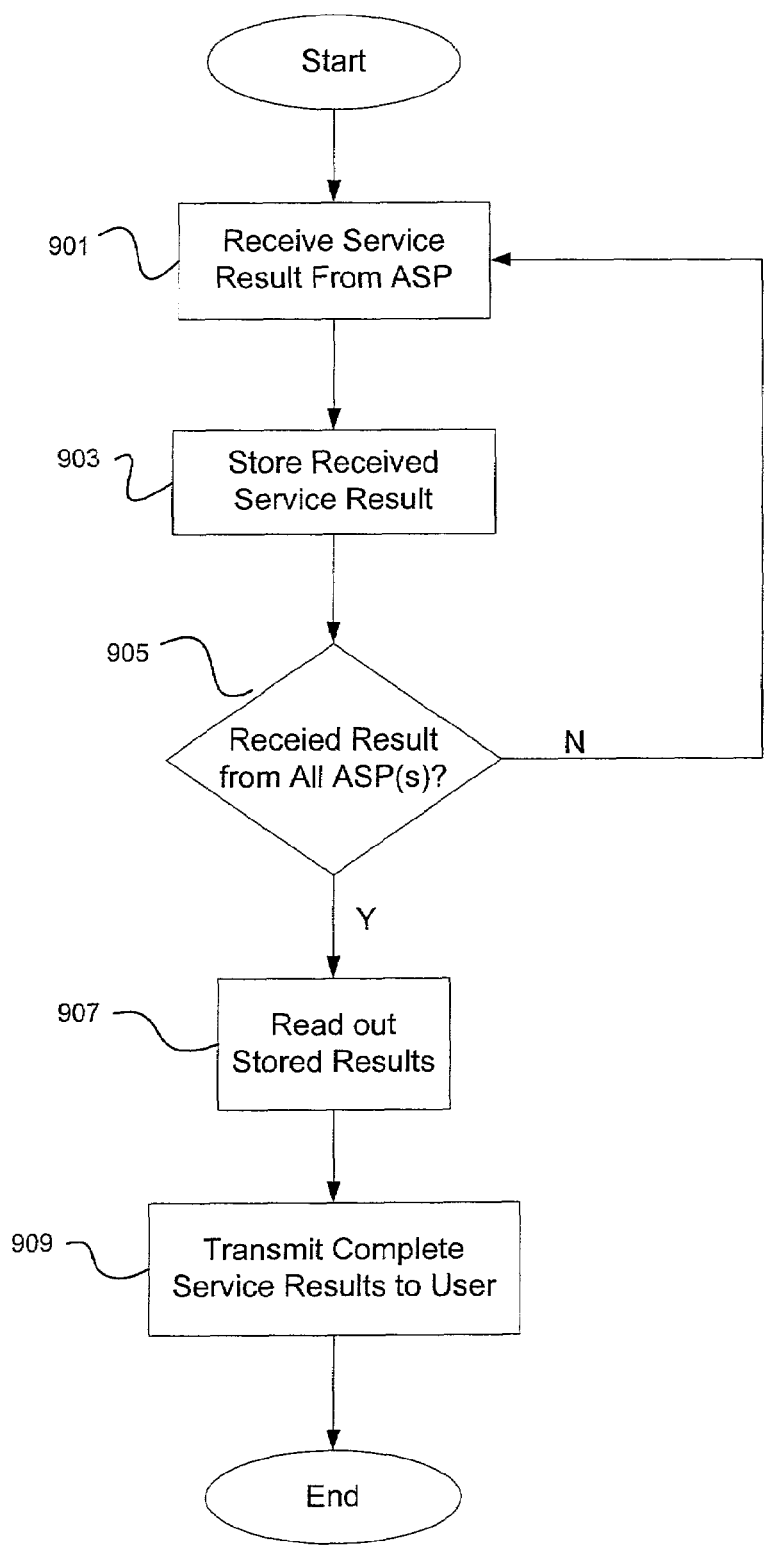
FIG. 9 is a flowchart showing a timing coordination function of the document manager according to one embodiment of the present invention.

The present invention also provides a timing coordination function for the user 70 where multiple ASPs are selected. In the case of a retrieval operation, the documents that have inputted keywords are stored in plural ASPS. Based upon the ASPs' retrieving ability and the volume of the retrieved documents, it is likely that the timing of outputting the retrieved documents is different among the ASPs. FIG. 9 illustrates a timing coordination function of the document manager 60 in accordance with an embodiment of the present invention. In step 901, the document manager 60 receives a service result from an ASP. The service result may be a document to be retrieved by the user 70 or some other information provided to the user. In step 903, the document manager 60 stores the service result in a memory such as the storage device 64. The document manager 60 then determines whether it has received all service results from all ASPs selected for the user's request as seen in decision block 905. Where all service results have not been received, the document manager 60 returns to step 901 to receive the additional service results. For example, where the document manager 60 selects 3 different ASPs to deliver documents to meet the users request, the document manager 60 monitors the documents received and stored for this request, and where only one or two document shave been received, awaits reception and storage of the remaining documents. When all service results have been received, the document manager 60 proceeds to step 907 where it reads out the stored service results from storage device 64, the complete results are then transmitted from the document manager 60 to the user 70 as shown by step 909.

Thus, in order to provide unified operation for the user, the retrieved documents from each ASP are once stored in the storing device 64 of the document manager 60. Under the control of the format-standardizing device 66, the document manager 60 determines whether or not the document manager 60 receives operation results from all selected ASPs. If the operation results from all selected ASPs are received, the format standardizing device 66 reads out the stored retrieved documents from the storing device 64, and transmits the retrieved results to the user.

Figure 10:
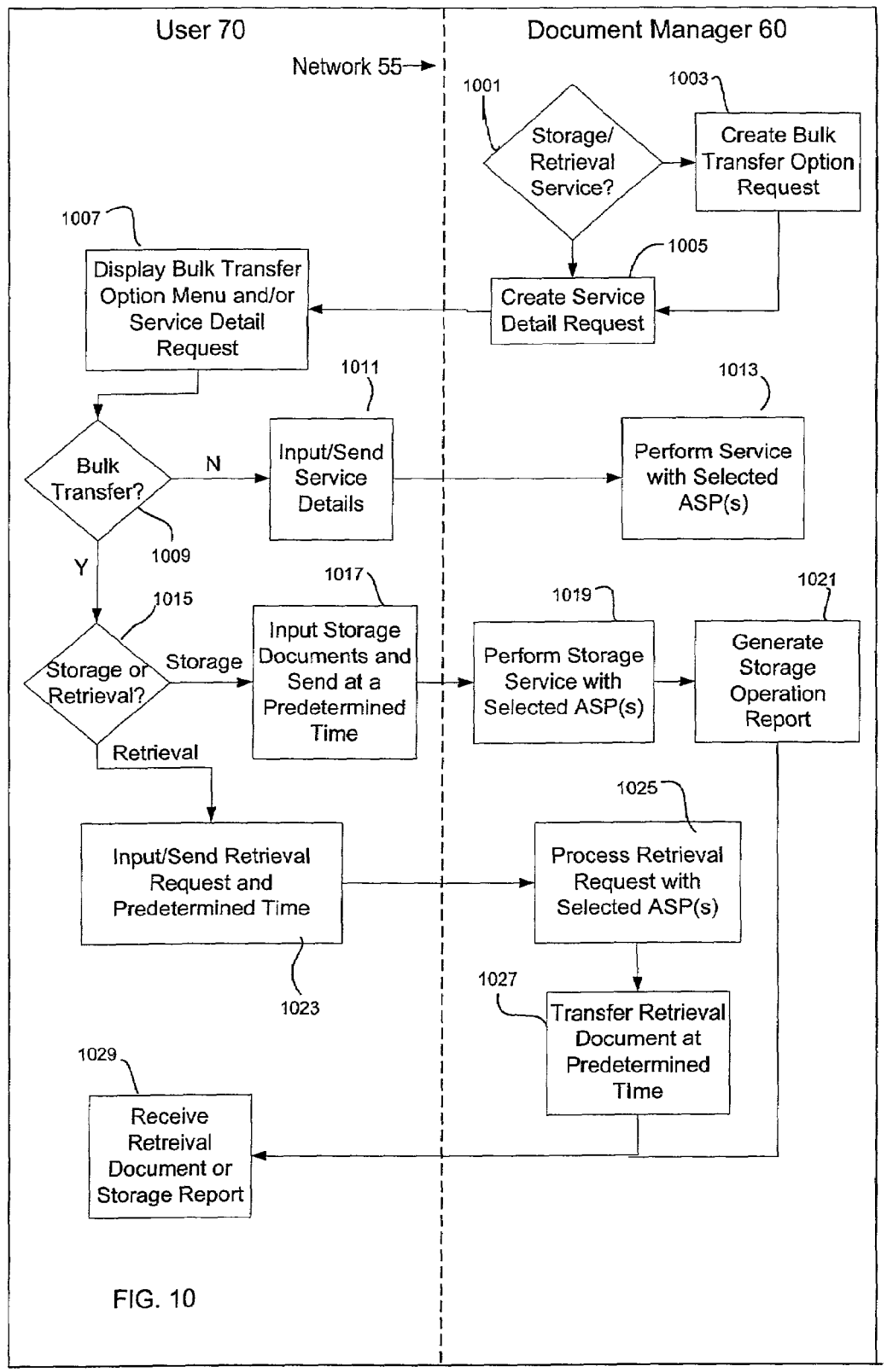
FIG. 10 is a flowchart showing a process for providing bulk transfer of documents between the user and document manager at a predetermined time according to one embodiment of the present invention.

As discussed in the background section above, one problem with conventional user requests to an ASP is that documents to be stored and/or retrieved from the ASP may be voluminous and therefore may disable the user's communications line for a long period of time. This problem is particularly significant for home users with low data speed network connections, and any other low speed communication system such as, but not limited to, wireless connections. The document manager 60 of the present invention provides a mechanism for allowing the user 70 to store and retrieve documents to ASPs without disabling the communications system of the user 70 at inconvenient times. FIG. 10 is a flowchart showing a process for providing bulk transfer of documents between the user 70 and document manager 60 at a predetermined time in accordance with an embodiment of the present invention. The "bulk transfer" described herein is similar to or may be considered to be a batch processing which is performed now, after a predetermined delay, or at a predetermined time. Such a transfer may be performed in accordance with the deferred delivery feature of Request for Comments (RFC) 1068 entitled BACK-GROUND FILE TRANSFER PROGRAM ("BFTP") by DeSchon et al., 1988, which is incorporated herein by reference. As with FIG. 6 described above, the flowchart of FIG. 10 is in relational format with a vertical dashed line representing network 55 separating the steps of the user 70, from the steps of the document manager 60.

As seen in FIG. 10, the process of providing a bulk transfer function for the user 70 begins with the document manager 60 determining whether a document storage or retrieval request has been made by the user as shown by decision block 1001. This allows the document manager 60 to avoid creating and sending a bulk transfer option to the user where the user is requesting a real time service such as access to a software application located at the ASP. Decision block 1001 may be performed by document manager 60 as part of the "process user request" step 633 in the embodiment of FIG. 6, or as part of the "feedback to user with service" step 4040 shown in FIG. 4.

In the typical situation where the user 70 has requested a storage or retrieval transaction, the document manager 60 creates a bulk transfer option request as shown in step 1003. The bulk transfer option request allows the user 70 to select a bulk transfer option for the transaction requested. After creating the bulk transfer option menu in step 1003, the document manager 60 proceeds to step 1005 where a service detail request is created and sent to the user 70 along with the bulk transfer option request. The service detail request is a request from the document manager 60 to the user 70 to provide more details about the service or transaction needed from the document manager and ASPs. For example, where the user 70 has requested a document search and retrieval, the service detail request may ask the user for a boolean search query. As another example, where the user 70 has requested access to a spreadsheet application located on the ASP, the service detail request may ask the user to input a spreadsheet application and the version of the application needed. If the document manager 60 determines in step 1001 that the user has not requested a storage or retrieval service, the document manager proceeds directly to step 1005 and creates and sends the service detail request to the user 70.

In step 1007, the user 70 displays the bulk transfer option request and/or service detail request to the operator of the user 70. The bulk transfer option request is preferably a selection area similar to the area 710, 740, and/or 750 of the document mall screen 742 illustrated in FIGS. 7A and 7B, and the service detail request is preferably displayed as an interactive area for the user to input information such as areas 720 and 730, or areas 740 and 750 of the display screen 742. Selection of the bulk transfer option and entry of detailed information may be accomplished, for example, by clicking a button on a mouse or remote control, pressing a key (or keys) on a keyboard or control panel, touching a display screen, or a speaking command, etc.

In decision block 1009 of FIG. 10, the user 70 determines whether the bulk transfer option has been selected by the operator based on inputs from the operator. Where a bulk transfer has not been selected, the user 70 inputs and sends the operator's service details in step 1011 to the document manager 60 which processes the user's request with the selected ASPs based on these details entered by the user in step 1013. Where the user 70 determines that a bulk transfer request has been made, flow proceeds to step 1015 where it determines whether the user's transaction is a storage transaction requesting to send documents to an ASP for storage, or a retrieval transaction requesting to receive documents delivered from the ASP. The storage/retrieval determination of step 1015 is made based on previous entries of the user.

Where the user's transaction is determined to be a storage transaction in step 1015, the user inputs the storage documents and sends the storage documents (documents to be stored at one or more of the ASPs) to the document manager 60 in step 1017 at a predetermined time (or immediately) which will be further described with respect to FIG. 12 below. In step 1019, the document manager 60 receives the storage documents and performs the storage service with the selected ASP(s). According to a preferred embodiment of the present invention, the document manager 60 generates a storage operation report in step 1021 based on feedback from the storage ASP(s). How the document manager 60 performs the storage service and generates a storage operation report will be further described below with respect to FIGS. 13 and 14.

Where the user 70 determines in step 1015 that the required transaction is a retrieval transaction, flow proceeds to step 1023 which inputs and sends the retrieval request to the document manager 60. The retrieval request may be a boolean search query or any other information for identifying the document to be retrieved from the ASP(s). In a preferred embodiment, the user may also input a predetermined time for the document manager 60 to return the retrieved document. Alternatively, the document manager 60 may select an appropriate time for delivering the document such as midnight when the communications line of the user 70 can be busy for a long period of time without inconvenience. Thus, in step 1025 the document manager 60 processes the document retrieval request with selected ASPS, and transfers the retrieval document at a predetermined time in step 1027. Alternatively, the transfer of the document or information may be immediately. In step 1029, the user 70 receives the retrieval document or storage report resulting from step 1021 or step 1027 respectively. Thus, as shown by the process in FIG. 10, the document manager 60 provides a bulk transfer of documents at a predetermined time between the user 70 and document manager 60. In a preferred embodiment, this feature is provided with a user device implemented as a multipurpose or multifunction machine, although any desired device such as any of the devices disclosed herein may be utilized.

FIGS. 11A, 11B, 11C, and 11D show a multifunction machine or document processing center that may serve as the user in accordance with an embodiment of the present invention. The multifunction document processing center in FIGS. 11A and 11B includes a central processing unit (CPU) 1131, and various elements connected to the CPU 1131 by an internal bus 1132. The CPU 1131 services multiple tasks while monitoring the state of the multifunction document processing center 1100. The elements connected to the CPU 1131 include a read only memory (ROM) 1133, a random access memory (RAM) 1134, a hard disk drive (HDD) 1135, a floppy disk drive (FDD) 1136 capable of receiving a floppy disk 1107, a communication interface (I/F) 1138, and a modem unit 1139. In addition, a control panel 1137, a scanner unit 1140, a printer unit 1141, and an image processing device 1142 can be connected to the CPU 1131 by the bus 1132. The I/F 1138 is connected to a network 1129 such as a local area network which is preferably connected to a wide area network such as the Internet, although any network or connection of networks may be utilized. The modem unit 1139 is connected to a communication network 1120, which is further connected to a network connection such as a public telephone line (not shown), or alternatively the modem unit 1139 is directly connected to a public telephone line. According to one embodiment of the present invention, the multifunction document processing center 1100 may be implemented as the server shown in U.S. Pat. No. 5,928,335, the entire content of which is hereby incorporated by reference.

In one embodiment where the multifunction document processing center 1100 includes a digital copier, the modem unit 1139, the scanner unit 1140, the printer unit 1141, and the image processing device 1142 are collectively called the image processing units of the multifunction document processing center 1100. These elements correspond to the hardware of the multifunction document processing center 1100 which carry out the image processing functions of the digital copier.

In a preferred embodiment, the program code instructions for the multifunction document processing center 1100 may be stored on the floppy disk 1107 so that the program code instructions can be read by the FDD 1136, transferred to the RAM 1134 and executed by the CPU 1131 to carry out the instructions. These instructions may be menu management instructions, such as instructions to create, select, retrieve, transmit, display, and store menus and are directed to implementing the method steps described in previously described in FIGS. 4, 6, and 10, or as described in FIGS. 12–14 below. These instructions permit the multifunction document processing center 1100 to interact as a user with the document manager 60 and to control the control panel 1137 and the image processing units of the multifunction document processing center 1100. Moreover, the instructions may also include any instructions necessary for the operation of the multifunction document processing center 1100.

Alternatively, the program code instructions may be read from the floppy disk 1107 to the HDD 1135. During a start-up of the multifunction document processing center 1100, the program code instructions may be read by the CPU 1131, transferred to the RAM and executed by the CPU 1131. Alternatively, the program code instructions may be loaded to the ROM 1133. It is therefore understood that in the present invention, any of the floppy disk 1107, the HHD 1135, the RAM 1134, and the ROM 1133 correspond to a computer readable storage medium capable of storing program code instructions or data structures utilized by the invention. Other devices and medium that can store the instructions and/or data structures according to the present invention include for example magnetic disks, optical disks including DVDs, magneto-optical disks such as MOs, and semiconductor memory cards such as PC cards, as well as any of the storage mediums discussed with respect to FIG. 15 below.

Figure 11A:
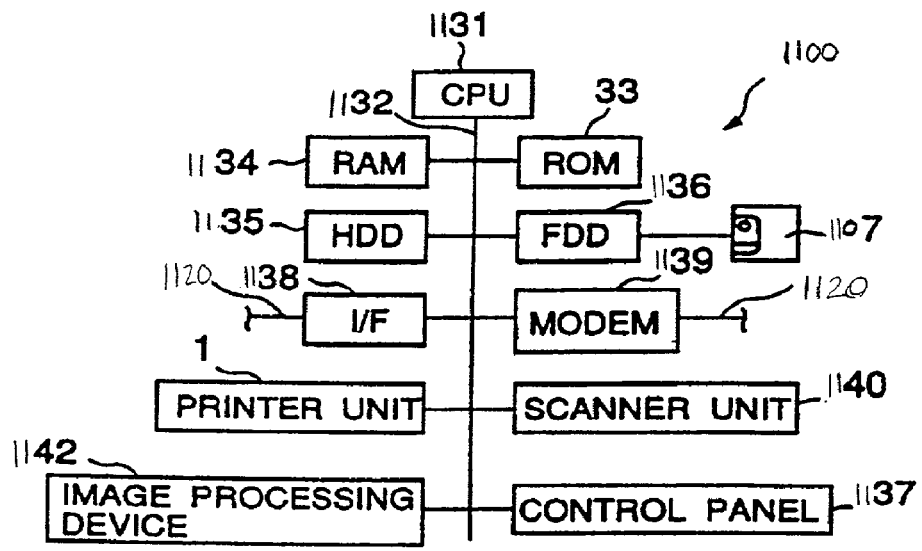
Figure 11B:
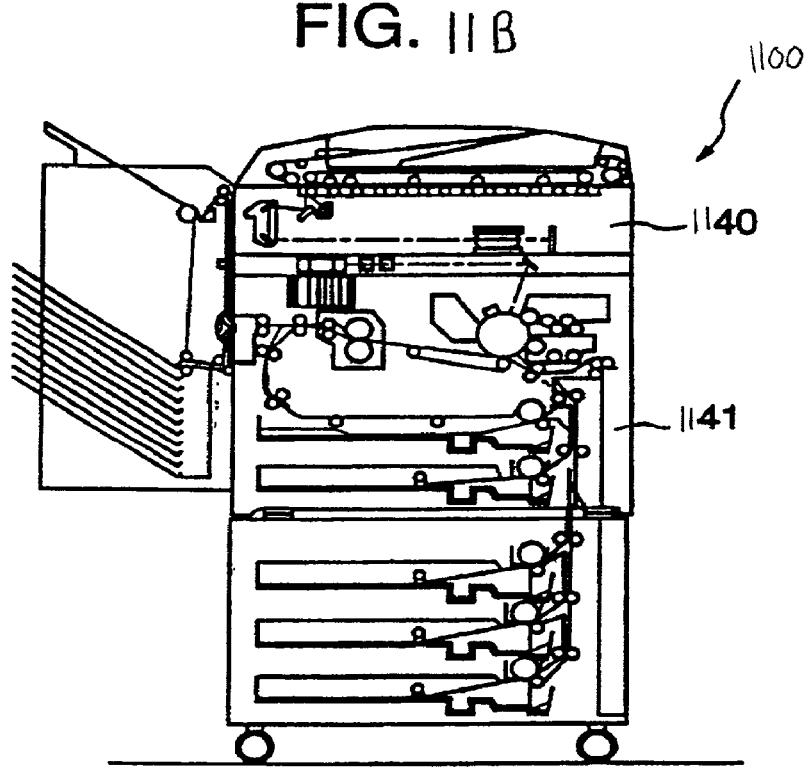

FIG. 11B illustrates the internal mechanical and electrical-mechanical components of the document processing center 1100. In this Figure, the scanner unit 1140 is mounted on top of the printer unit 1141, although any desired configuration or arrangements of the elements of the printer unit 1141 and the scanner unit 1140 may be utilized. For example, the printer unit 1141 and the scanner unit 1140 may be physically separate from each other.

FIG. 11C shows the configuration of the control panel 1137 in accordance with one embodiment of the present invention. As seen in this figure, the control panel 1137 includes a display 1142 that displays menus and messages allowing the operator of the multifunction document processing center 1100 to interact with the document manager 60. In a preferred embodiment, the display 1142 displays the document mall screens of FIGS. 7A and 7B. The display screen 1142 may be a liquid crystal display (LCD), a plasma display device, a cathode ray tube (CRT) display or any other suitable display suitable for providing an image to the operator of the multifunction document processing center 1100. While the display 1142 is shown as being integral with the control panel 1137 in FIG. 11C, the display does not have to be integral with, or embedded in, the control panel 1137, but may simply be coupled to the control panel 1137 by either a wire or a wireless connection. The control panel 1137 may also include keys for inputting information or requesting various operations. Alternatively, the control panel 1137 and the display screen 1142 may be operated by a keyboard, a mouse, a remote control, touching the display screen 1142, voice recognition, or eye-movement tracking, or a combination thereof.

As also seen in FIG. 11C, the control panel 1137 can include a contrast amount key 1143 for changing a contrast of the display 1142 and a display mode switch 1155 for switching a display from a first mode to a second mode when depressed, located adjacent to the display screen 1142. For example, by depressing the display mode switch 1155, an operator can switch from a digital copying mode display to an ASP document request mode display such as those displayed in FIGS. 7A and 7B. The control panel 1137 can also include a mode reviewing key 1144 for displaying the selected modes already set, and a menu or message changing key 1145 for changing the menu or messages to be displayed on the display screen 1142. For example, the operator can depress the message changing key 1145 to change from a document profile menu as shown in FIG. 7A to an industrial category menu shown in FIG. 7B. The control panel 1137 can also include a program calling key 1146 for calling or executing a user program when depressed, a user program register key 1147 for registering a user program when depressed, and a guidance key 1148 for displaying a guidance or help menu in the display 1142. The control panel 1137 can also include a print switch 1149 for starting a copying operation or ASP document operation when depressed, a ten key keypad 1150 for inputting data, or an alphanumeric keypad (not shown). These keypads can be used for example to enter the operator's user I.D., password, document name and type of document to store or retrieve, location to store the document, keywords, dates, access level and other information for interacting with the document manager 60. Of course, the key pad 1150 can also be used to enter copy mode information, such as the number of copies, or the percentage magnification/reduction desired.

The control panel 1337 may also include a set number clear and copy stop key 1151 for either clearing set numbers or parameters, or stopping a copying operation when depressed, and a confirming or enter key 1152 for confirming information entered by the operator in order to use the document manager 60, such as a user I.D., password, document type, document name, keywords, dates, access levels, and type of requests for the document manager 60. The confirming or enter key 1152 may also be used to confirm information to use the multifunction document processing center 1100 as a copy machine, such as the number of copies, magnification/reduction and/or a margin of a copy sheet. The control panel 1137 may also include an interruption copy key 1153 for interrupting a document storing operation, a document retrieving operation, or a copying operation when depressed. A preheat key 1154 for preheating a fixing roller, and/or a mode-clear key 1154 clearing a preset mode can also be included to the control panel 1137. According to one embodiment of the present invention, the control panel 1137 can be implemented using the control panel shown in U.S. Pat. No. 6,023,593, which is incorporated herein by reference.

Figure 11D:
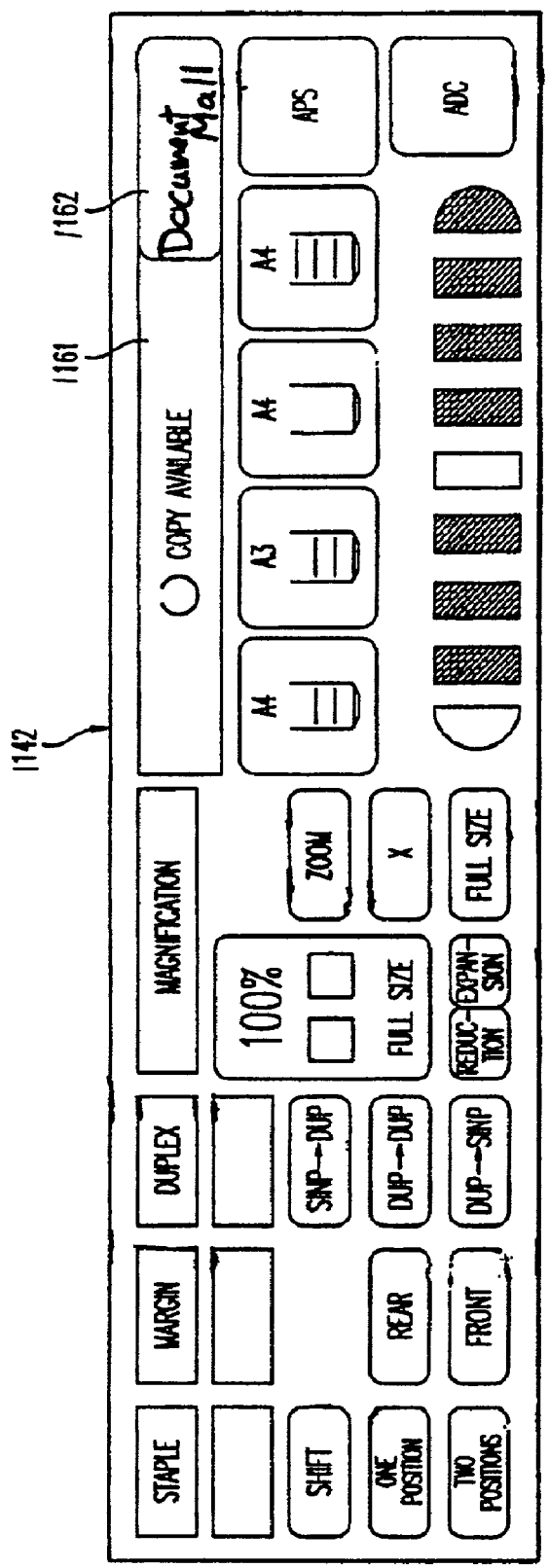

As indicated above, the display screen 1142 displays the document mall screens shown in FIGS. 7A and 7B. The display 1142 can be made of a dot or pixel displaying device, utilizing for example, a liquid crystal or a fluorescent material, and can include a matrix touch panel overlaid on the dot displaying device, thereby allowing the operator to input commands to the multifunction document processing center 1100 by depressing the display screen 1142 itself. An example of such a display screen 1142 is shown in FIG. 11D. The display screen 1142 can be used to display one or a plurality of copy options and messages, for example to select a paper tray, to request stapling of the copies, to reduce or magnify, to set margins, etc. In addition to these copy mode settings and messages, the display screen 1142 of the present invention can display ASP document mode features to permit an operator of the multifunction document processing center 1100 to interact with the document manager 60. In the embodiment shown in FIG. 11D, the display screen 1142 displays a "Document Mall" selection button 1162 which allows the operator to select (e.g. by touching the "Document Mall" selection button 1162) the ASP document mode and to have an ASP document mode menu displayed. In this example, the "Document Mall" selection button is positioned next to a message display area 1161, which may display copy mode messages and/or ASP document mode messages. In a preferred embodiment, the display screen 1142 shown in FIG. 11D is a basic menu (or "basic screen"), which is read from the RAM 1134 and displayed when the multifunction document processing center 1100 is turned on.

Advantageously, once the "Document Mall" button 1162 is selected on display screen 1142 (or the ASP document mode is otherwise requested) the display screen 1142 can display a menu for document ASP modes that is customized to the operator of the multifunction document processing center 1100. For example, upon entering a user I.D. and a password, the multifunction document processing center 1100 selects a customized menu to permit the operator to interact with the document manager 60. The customized menus may be stored at the multifunction document processing center 1100 (for example in the floppy disk 1107, the HHD 1135, the RAM 1134, and/or the ROM 1133), received from the document manager 60, or at another location, such as a general purpose computer (like the computer system shown in FIG. 15) which may be connected to the document manager via a network, such as a LAN.

In one embodiment, the operator of the multifunction document processing center 1100 enters a user I.D. and the password using a default ASP document menu displayed after the ASP document mode is selected. The multifunction document processing center 1100 then requests the desired customized menu using a look-up table stored for example in one of the server's storage devices, such as the floppy disk 1107, the HHD 1135, the RAM 1134, and/or the ROM 1133 or any other suitable storage device. For example, an operator "A" may enter her user I.D. which prompts the multifunction document processing center 1100 to select an ASP document mode menu customized for the ABC company for which operator "A" works. The multifunction document processing center 1100 thus can provide the operator "A" with a company level customization. Alternatively, or in addition, an operator "B" may enter her user I.D. which prompts the multifunction document processing center 1100 to select a menu customized for the legal department of the DEF company for which operator "B" works. The multifunction document processing center 1100 thus can provide the operator "B" with a group (or department) level customization. Alternatively, or in addition, an operator "C" may enter her user I.D. which prompts the multifunction document processing center 1100 to select a menu customized for the operator "C". The multifunction document processing center 1100 thus can provide the operator "C" with an individual level customization. If the multifunction document processing center 1100 is part of a system that utilizes groupware such as Lotus Notes, the company name, the group or department name, and/or the individual name can be read out and from the groupware database.

Figure 13:
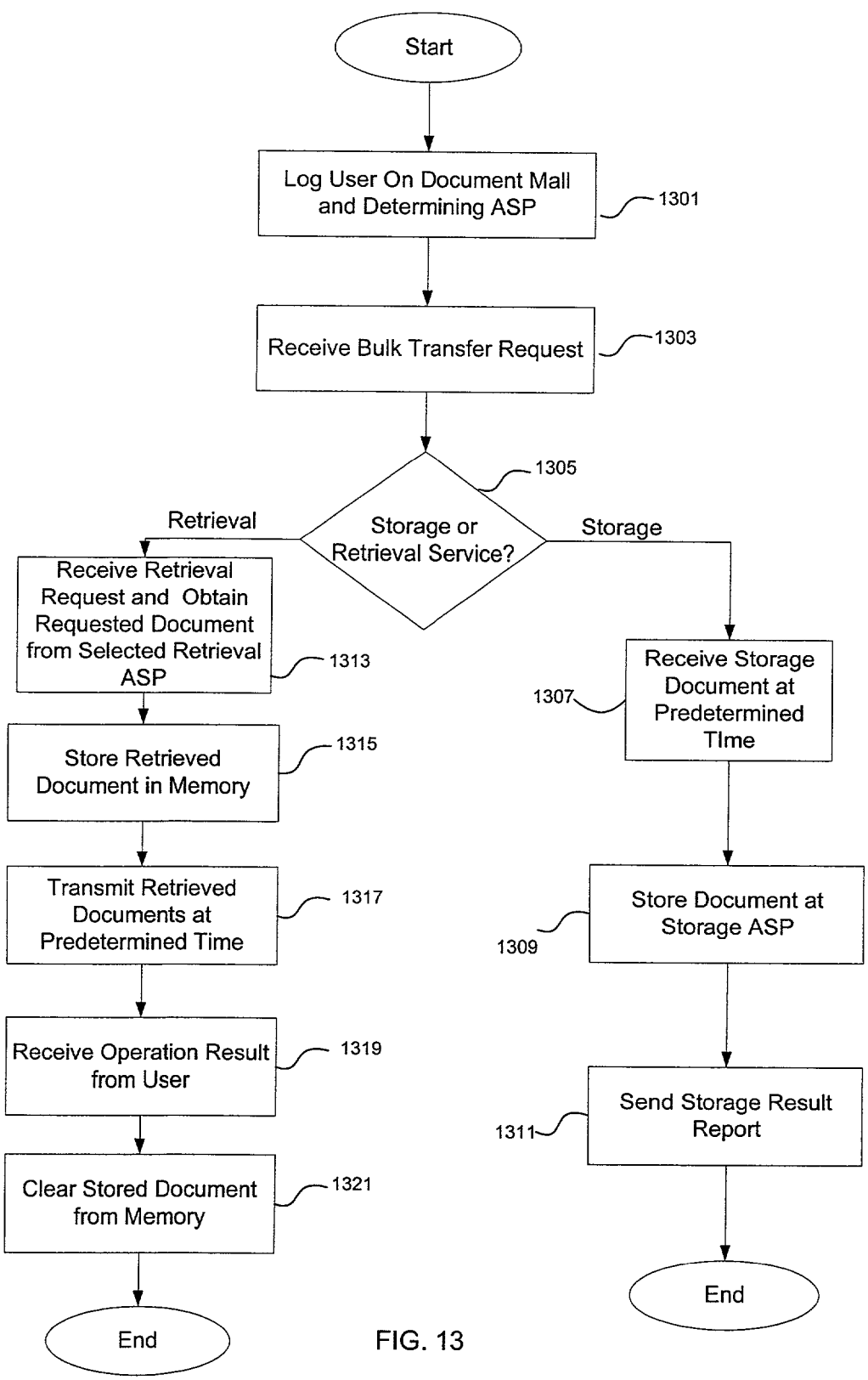
FIG. 13 is a flowchart showing the process for implementing a bulk transfer in the document manager in accordance with an embodiment of the present invention.
Figure 14:
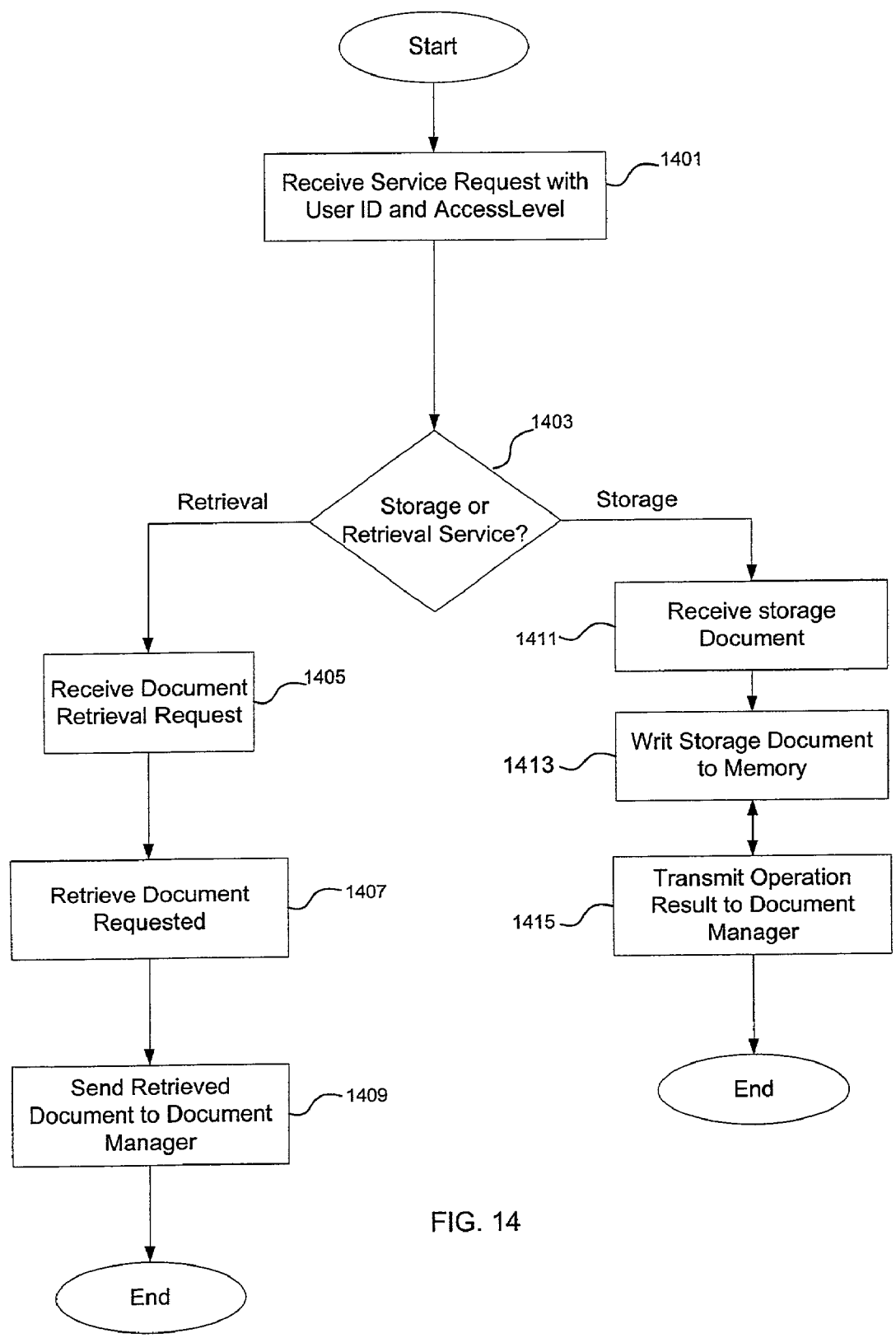
FIG. 14 is a flowchart showing the process for implementing a bulk transfer in the selected ASP in accordance with an embodiment of the present invention.

Thus, the multifunction document processing center 1100 provides general document processing functions such as copying and printing, as well as a user interface to the document manager 60. The multifunction document processing center 1100 would generally provide a central unit to be shared by several office workers in a business entity, for example. Thus, in providing a user interface with the document manager 60, according to one embodiment, large documents stored to or retrieved from ASPs via the document manager 60 do not tie up the communications line 1120 for long periods of time during business hours. Thus, the multifunction document processing center 1100 is an ideal user for offering the bulk transfer feature generally discussed with regard to FIG. 10 above. However, if the multifunction document processing center 1100 has a fast communication connection and/or the size of the documents being retrieved is not too large, the bulk transfer feature may not be utilized. FIGS. 12, 13, and 14 show flowcharts that show the bulk transfer process for the multifunction document processing center 1100, document manager 600, and ASP respectively.

Figure 12:
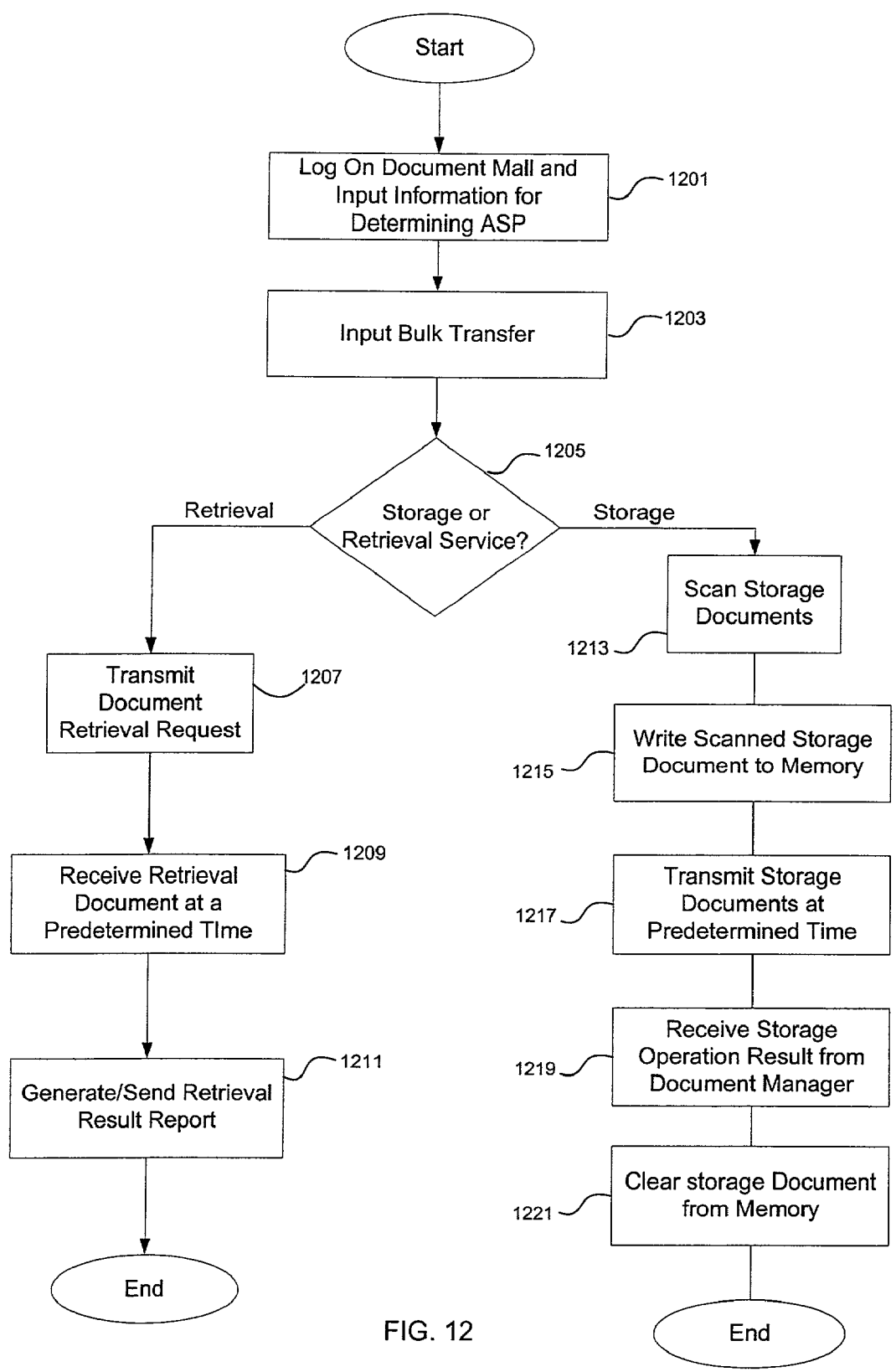
FIG. 12 is a flowchart showing the process for implementing a bulk transfer in the multifunction document processing center in accordance with an embodiment of the present invention.

FIG. 12 is a flowchart showing the process for implementing a bulk transfer in the multifunction document processing center 1100 in accordance with an embodiment of the present invention. After starting, in step 1201, the operator of the multifunction document processing center 1100 logs on to the document mall and inputs information used by the document manager 60 to determine an ASP. In this regard, the operator of the multifunction document processing center 1100 interacts with the document manager 60 as described in FIG. 6 above by way of the display 1142. In step 1203, the multifunction document processing center 1100 inputs a bulk transfer command in response to the operator depressing the control panel or otherwise indicating the bulk transfer option for a storage or retrieval operation as also described above. As the multifunction document processing center 1100 processes storage bulk transfers in a different manner than retrieval services, in decision block 1205, the multifunction document processing center 1100 determines whether the operator has requested a storage or retrieval transaction with an ASP. This determination is made based on information obtained as part of the log on and ASP determination process of step 1201.

Where the ASP transaction is a document retrieval transaction, the multifunction document processing center 1100 proceeds to step 1207 and transmits a document retrieval request to the document manager 60 via communications line 1120. The document retrieval request is entered into the multifunction document processing center 1100 by way of the control panel 1137 and display 1142. As indicated in FIG. 10 above, the document retrieval request may be a boolean search query and may include a predetermined time at which the operator of the document processing center 1100 wishes the document to be received by the multifunction document processing center 1100 in step 1209. In a preferred embodiment, the multifunction document processing center 1100 generates and sends a retrieval result report via communications line 1120 as shown in step 1211. The retrieval result report informs the document manager 60 that the retrieval documents have been received as will be further described in FIG. 13 below. In a preferred embodiment, the multifunction document processing center 1100 generates and sends the retrieval result report only after the operator confirms that the requested documents have been received without problems.

If the decision block 1205 results in the multifunction document processing center 1100 determining that the operator wishes to perform a storage transaction, the multifunction document processing center 1100 inputs the documents to be stored at the ASP by scanning the documents in step 1213 using the scanner unit 1140. The scanning of step 1213 is preferably performed by an optical scanning device but may be performed by any scanning or character recognition technology such as magnetic ink character recognition, for example. As an alternative to scanning, step 1213 may be performed by generating a document in an electronic representation in any desired manner, such as by saving or writing the document in a desired format such as but not limited to Microsoft Word format, "PDF" format using Adobe Acrobat, or using any desired software program. Moreover, the electronic representation which is utilized may be in existence at the time step 1205 is performed, if the document is not scanned in step 1213. In one embodiment, the scanning step 1213 is performed when the operator of the multifunction document processing center 1100 places the documents into a feeder of the scanner unit 1140 in response to a message displayed on the display 1142. The multifunction document processing center 1100 then writes the scanned document to the HDD 1135 where it remains until the multifunction document processing center 1100 transmits the storage document(s) to the document manager 60 at a preselected time by way of the communication lines 1120 as shown in step 1217.

According to a preferred embodiment, the HDD 1135 has a specific folder or directory which is made by the operator wherein the images which are stored in the specific folder are transmitted to the selected ASP at a predetermined time. For instance, the multifunction document processing center has a timer to set a time when the stored documents in the HDD 1135 are transmitted to the selected ASP automatically. The scanned documents under the bulk transfer mode are stored in the specific folder in the HDD 1135 until the pre-set time. The pre-set time is preferably a convenient time when operators of the multifunction document processing center 1100 will not be inconvenienced by a long busy period of the communications line 1120. The CPU 1131 checks whether an actual time reaches the preselected time, and if the actual time reaches the pre-selected time, the CPU controls or commands a read out of the stored documents from the specific folder in the HDD 1135, and transmits the read documents either to the selected ASP or the document manager 60. In one embodiment of the present invention, during the 24 hours, documents which have different document profiles can be stored in the hard disk, and subsequently transmitted to different ASPs based on the corresponding document profile.

In step 1219, the multifunction document processing center 1100 receives a storage operation result that is generated and sent from the document manager as will be further described with respect to FIG. 13 below. In a preferred embodiment, once the multifunction document processing center 1100 has received the storage operation result from the document manager 60, the multifunction document processing center 1100 automatically clears the stored or scanned storage documents from the HDD 1135. According to the present embodiment, the batch transmission mode is set by manually inputting or selecting the mode. However, it is also possible to have such a batch transmission mode be the default mode which is automatically used, unless deselected by the user. Moreover, it is also possible to set the batch transmission mode if the controller of the copier detects an image tag such as bar code that is on the document. The bar code includes information to instruct the batch transmission mode and document profile such as user ID, selected ASP and e-mail address. The use of bar codes to encode information, and the reading and decoding of bar codes is generally known and is described for example, in U.S. Pat. Nos. 5,677,770, and 5,671,282 which are incorporated herein by reference. The Asp(s) selection and/or Document menu downloading may be performed based on the information of a bar code in the same manner as described above.

FIG. 13 is a flowchart showing the process for implementing a bulk transfer in the document manager 60 in accordance with an embodiment of the present invention. In step 1301, the document manger 60 logs the user onto the document mall and receives information used for determining and selecting an ASP. As discussed above, the operator of the multifunction document processing center 1100 interacts with the document manager 60 to log on to the document manager 60, and transmit ASP determining information and a bulk transfer option to the document manager 60. In step 1303, the document manager 60 receives the bulk transfer request from the multifunction document processing center 1100. As the document manager 60 processes storage bulk transfers in a different manner than retrieval transfers, in decision block 1305, the document manager 60 determines whether the user has requested a storage or a retrieval transaction. This determination is made based on information obtained as part of step 1301 and/or 1303.

Where the ASP transaction is a document storage transaction, flow proceeds from step 1305 to step 1307 in which the document manager 60 receives the storage document sent from the multifunction document processing center 1100 as described in step 1217 of FIG. 12 at the predetermined time. In step 1309, the document manager 60 transmits the storage document to the selected storage ASP. According to a preferred embodiment, the document manager 60 sends a storage result report in step 1311 to the multifunction document processing center 1100 via communications line 1120 to report that the user storage request has been completed by the document manager 60.

If the decision block 1305 results in the document manager 60 determining that the user wishes to perform a retrieval transaction, the document manager 60 receives the document retrieval request from the user and retrieves the requested document from the selected retrieval ASP as shown in step 1313. Once the document manager 60 has obtained the retrieval document from the selected ASP in step 1313, the document manager 60 writes the retrieved document to a memory such as the storage device 64 of the document manager 60, as shown in step 1315.

In step 1317, the document manager 60 transmits the retrieved documents to the user at a predetermined time. As with the multifunction document processing center 1100 described in step 1217 of FIG. 12, the document manager 60 preferably includes a timer or clock which sets a time when the stored documents in the storage device 64 are to be transmitted to the user automatically. Moreover, as also discussed, the pre-set time may be a time requested by the user in step 1301 and 1303 above, or may be a time selected by the document manager 60. As discussed with respect to step 1211 in FIG. 12, the multifunction document processing center 1100 generates a retrieval result report and sends this report to the document manager 60. In step 1319, the document manager 60 receives the retrieval result report from the user. In step 1321, the document manager 60 then clears the stored retrieval document from the storage device 64 of the document manager 60.

FIG. 14 is a flowchart showing the process for implementing a bulk transfer in the selected ASP in accordance with an embodiment of the present invention. In step 1401, the selected ASP receives the service request from the document manager 60. The service request received by the selected ASP may be accompanied by a user ID and/or other information that will allow the selected ASP to send a document directly to the multifunction document processing center 1100 if necessary. Moreover, the service request in step 1401 may be accompanied by access level information used to implement access level control as described above with respect to FIG. 5B. As the selected ASP must process a bulk storage transfer in a different manner than a retrieval transfers, in decision block 1403, the selected ASP determines whether the operator and/or document manager 60 has requested a storage or retrieval transaction with the ASP.

When the requested service is a document retrieval transaction, the ASP receives the document retrieval request instruction from the document manager 60 in step 1405. The ASP then retrieves the requested retrieval document from a storage space from which the selected ASP operates as shown in step 1407. Once the retrieved document is obtained, the selected ASP then sends the retrieved document to the document manager 60. In one embodiment of the present invention, the selected ASP may also send or transmit the retrieved document to the user where the ASP has obtained a user ID and/or other user information in step 1401 as described above. Such a transmission to the user or multifunction document processing center 1100 occurs at a predetermined or present time, after a predetermined delay, as soon as possible, or immediately. In this embodiment, the document manager 60 serves primarily to log the retrieval transaction and/or provide a unified bill to the user.

Where the selected ASP determines in step 1403 that the requested ASP service is a storage transaction, the selected ASP receives the stored document from the document manager 60 or the user 70 as shown in step 1411. In one embodiment of the present invention, the storage document received in step 1411 is accompanied by access level information for the selected ASP to implement access level control as previously discussed. Moreover, the storage document received from the document manager 60 and/or user, may include user e-mail address information. In step 1413, the selected ASP stores or writes the storage document to storage space used in the operation of the ASP. Once the user's storage document is stored in the ASP storage space, the selected ASP transmits an operation result to the document manager 60 so that the document manager 60 may create a storage result report and transmit this report to the user 70 as described above. In one embodiment, where the storage document received in step 1411 is accompanied by user e-mail address information, the selected ASP also transmits an operation result to the user. FIG. 14 shows an operation of the selected ASP. If the ASP receives documents with user ID and access level information, the ASP engine checks whether or not a folder corresponding the user ID exists. If a folder exists, the ASP engine controls the storage of such documents to the folder corresponding to the user ID. When the storage operation of step 1413 is completed, the ASP engine commands a transmission of the operation result to the document manager in step 1415. The process of FIG. 14 then ends.

Figure 15:
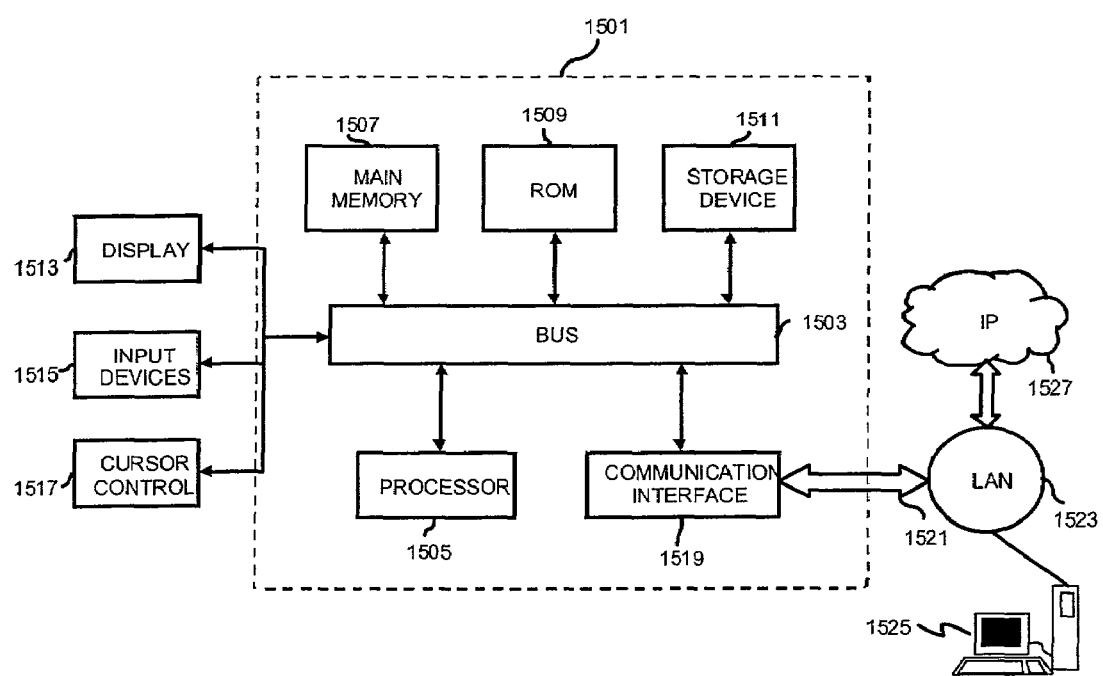
FIG. 15 is a schematic illustration of a computer system programmed to perform one or more special purpose functions of the present invention.

FIG. 15 illustrates a computer system 1501 upon which an embodiment according to the present invention may be implemented. The illustrated computer and/or computer system may be utilized with or as any of processing or computing devices utilized with or by the invention. Computer system 1501 includes a bus 1503 or other communication mechanism for communicating information, and a processor 1505 coupled with bus 1503 for processing the information. Computer system 1501 also includes a main memory 1507, such as a random access memory (RAM) or other dynamic storage device (e.g., dynamic RAM (DRAM), static RAM (SRAM), synchronous DRAM (SDRAM), flash RAM), coupled to bus 1503 for storing information and instructions to be executed by processor 1505. In addition, main memory 1507 may be used for storing temporary variables or other intermediate information during execution of instructions to be executed by processor 1505. Computer system 1501 further includes a read only memory (ROM) 1509 or other static storage device (e.g., programmable ROM (PROM), erasable PROM (EPROM), and electrically erasable PROM (EEPROM)) coupled to bus 1503 for storing static information and instructions for processor 1505. A storage device 1511, such as a magnetic disk or optical disc, is provided and coupled to bus 1503 for storing information and instructions.

The computer system 1501 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 1501 using an appropriate device bus (e.g., a small computer system interface (SCSI) bus, an enhanced integrated device electronics (IDE) bus, or an ultra-direct memory access (DMA) bus). The computer system 1501 may additionally include a compact disc reader, a compact disc reader-writer unit, or a compact disc juke box, each of which may be connected to the same device bus or another device bus.

Computer system 1501 may be coupled via bus 1503 to a display 1513, such as a cathode ray tube (CRT), for displaying information to a computer user. The display 1513 may be controlled by a display or graphics card. The computer system includes input devices, such as a keyboard 1515 and a cursor control 1517, for communicating information and command selections to processor 1505. The cursor control 1517, for example, is a mouse, a trackball, or cursor direction keys for communicating direction information and command selections to processor 1505 and for controlling cursor movement on the display 1513. In addition, a printer may provide printed listings of the data structures shown in FIGS. 5A, 5B, and 5C, or any other data stored and/or generated by the computer system 1501.

The computer system 1501 performs a portion or all of the processing steps of the invention in response to processor 1505 executing one or more sequences of one or more instructions contained in a memory, such as the main memory 1507. Such instructions may be read into the main memory 1507 from another computer-readable medium, such as storage device 1511. One or more processors in a multi-processing arrangement may also be employed to execute the sequences of instructions contained in main memory 1507. In alternative embodiments, hard-wired circuitry may be used in place of or in combination with software instructions. Thus, embodiments are not limited to any specific combination of hardware circuitry and software.

As stated above, the system 1501 includes at least one computer readable medium or memory including instructions used to carry out processing according to the teachings of the invention and for containing data structures, tables, records, or other data described herein. Stored on any one or on a combination of computer readable media, the present invention includes software for controlling the computer system 1501, for driving a device or devices for implementing the invention, and for enabling the computer system 1501 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions or data to processor 1505 for execution. A computer readable medium may take many forms, including but not limited to, non-volatile media, volatile media, and transmission media. Non-volatile media includes, for example, optical, magnetic disks, and magneto-optical disks, such as storage device 1511. Volatile media includes dynamic memory, such as main memory 1507. Transmission media includes coaxial cables, copper wire and fiber optics, including the wires that comprise bus 1503. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 1505 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1501 may receive the data on the telephone line and use an infrared transmitter to convert the data to an infrared signal. An infrared detector coupled to bus 1503 can receive the data carried in the infrared signal and place the data on bus 1503. Bus 1503 carries the data to main memory 1507, from which processor 1505 retrieves and executes the instructions. The instructions received by main memory 1507 may optionally be stored on storage device 1511 either before or after execution by processor 1505.

Computer system 1501 also includes a communication interface 1519 coupled to bus 1503. Communication interface 1519 provides a two-way data communication coupling to a network link 1521 that is connected to a local network (e.g., LAN 1523). For example, communication interface 1519 may be a network interface card to attach to any packet switched local area network (LAN). As another example, communication interface 1519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1519 sends and receives electrical, electromagnetic or optical signals that carry digital data streams representing various types of information.

Network link 1521 typically provides data communication through one or more networks to other data devices. For example, network link 1521 may provide a connection through LAN 1523 to a host computer 1525 or to data equipment operated by a service provider, which provides data communication services through an IP (Internet Protocol) network 1527 (e.g., the Internet). LAN 1523 and IP network 1527 both use electrical, electromagnetic or optical signals that carry digital data streams. The signals through the various networks and the signals on network link 1521 and through communication interface 1519, which carry the digital data to and from computer system 1501, are exemplary forms of carrier waves transporting the information. Computer system 1501 can transmit notifications and receive data, including program code, through the network(s), network link 1521 and communication interface 1519.

Obviously, numerous additional modifications and variations of the present invention are possible in light of the above teachings. It is therefore to be understood that within the scope of the appended claims the present invention may be practiced otherwise than as specifically described herein.

What is claimed is:

1. A method for managing applications service provider (ASP) documents, comprising:
    requesting a transfer of an ASP document at an ASP user device connected to a remote document manager and a remote ASP via a network;
    determining whether said ASP document is either a storage document for storing in said remote ASP or a retrieval document for retrieving from said remote ASP;
    establishing a predetermined time for effecting the transfer of said ASP document between the user and the ASP; and
    transferring said ASP document at said predetermined time via said network.

2. The method of claim 1, wherein said step of requesting a transfer comprises sending a deferred transfer request to said remote document manager via said network when the ASP user device logs on to said remote document manager.

3. The method of claim 1, further comprising the steps of:
    logging on to said remote document manager by the ASP user device,
    wherein said step of requesting a transfer comprises inputting a deferred transfer option from a menu received from said remote document manager via said network after said user device logs on to said remote document manager.

4. The method of claim 1, wherein said step of establishing a predetermined time for effecting a transfer of said ASP document comprises:
    inputting said predetermined time; and
    sending said predetermined time to said remote document manager via said network.

5. The method of claim 1, wherein said step of establishing a predetermined time for effecting a transfer of said ASP document comprises requesting said remote document manager to establish said predetermined time without sending a predetermined time to said remote document manager.

6. The method of claim 1, wherein said step of transferring said ASP document at a predetermined time via said network comprises transferring said ASP document via the Internet.

7. The method of claim 1, wherein said determining step comprises:
    determining that said ASP document is a storage document based on an operator input to said ASP user device; and
    inputting said storage document into said ASP user device,
    wherein said transferring step comprises transferring said ASP document via said network at said predetermined time.

8. The method of claim 7, wherein said step of inputting said ASP document into said ASP user device comprises:
    optically scanning a paper copy of said ASP document to provide a digital signal representative of said paper copy of said ASP document; and
    storing said digital signal in a memory associated with said ASP user device.

9. The method of claim 7, wherein said step of inputting said ASP document into said ASP user device comprises downloading an electronic copy of said ASP document from an external source to a memory associated with said ASP user device.

10. The method of claim 7, wherein said step of transferring said ASP document via said network comprises sending said ASP document to said remote document manager at said predetermined time.

11. The method of claim 7, wherein said step of transferring said ASP document via said network comprises sending said ASP document to said remote ASP at said predetermined time.

12. The method of claim 7, further comprising receiving a storage operation report at said ASP user device.

13. The method of claim 12, wherein said step of receiving comprises receiving said storage operation report from said remote document manager.

14. The method of claim 12 further comprising receiving said storage operation report from said remote ASP device.

15. The method of claim 12, further comprising clearing said ASP document from a memory of said ASP user.

16. The method of claim 1, wherein said determining step comprises:
    determining that said ASP document is a retrieval document based on an operator input to said ASP user device;
    generating a document retrieval request in said ASP user device;
    sending said document retrieval request to said remote document manager via said network; and
    receiving said retrieval document at said predetermined time.

17. The method of claim 16, wherein said step of receiving said retrieval document comprises receiving said retrieval document from said remote document manager at said predetermined time.

18. The method of claim 16, wherein said step of receiving said retrieval document comprises receiving said retrieval document from said remote ASP at said predetermined time.

19. The method of claim 16, further comprising generating a document retrieval result report.

20. The method of claim 19, further comprising sending said document retrieval result report to said remote document manager via said network.

21. The method of claim 19, further comprising sending said document retrieval result report to said remote ASP manager via said network.

22. A computer readable medium containing program instructions for execution on a computer system, which when executed by the computer system, cause the computer system to perform the steps in the method recited in any one of claims 1–21.

23. A system comprising:
a memory device having embodied therein, data related to managing applications service provider (ASP) documents; and
a processor in communication with said memory device, said processor configured to:
request a transfer of an ASP document at an ASP user device connected to a remote document manager and a remote ASP via a network;
determine whether said ASP document is either a storage document for storing in said remote ASP or a retrieval document for retrieving from said remote ASP;
establish a predetermined time for effecting the transfer of said ASP document between the user and the ASP; and
transfer said ASP document at a predetermined time via said network.

24. The system of claim 23, wherein said processor is configured to request a transfer by sending a deferred transfer request to said remote document manager via said network when the ASP user device logs on to said remote document manager.

25. The system of claim 23, wherein said processor is further configured to:
log on to said remote document manager by the ASP user device,
and said processor requests a transfer by inputting a deferred transfer option from a menu received from said remote document manager via said network after said user device logs on to said remote document manager.

26. The system of claim 23, wherein said processor is configured to establish a predetermined time for effecting a transfer of said ASP document by:
inputting said predetermined time; and
sending said predetermined time to said remote document manager via said network.

27. The system of claim 23, wherein said processor is configured to establish a predetermined time for effecting a transfer of said ASP document by requesting said remote document manager to establish said predetermined time without sending a predetermined time to said remote document manager.

28. The system of claim 23, wherein said processor is configured to transfer said ASP document at a predetermined time via said network by transferring said ASP document via the Internet.

29. The system of claim 23, wherein said processor is configured to determine whether said ASP document is a storage document for storing in said remote ASP or a retrieval document for retrieving from said remote ASP by:
determining that said ASP document is a storage document based on an operator input to said ASP user device; and
inputting said storage document into said ASP user device,
wherein said transferring step comprises transferring said ASP document via said network at said predetermined time.

30. The system of claim 29, wherein said processor is configured to input said ASP document into said ASP user device by:
optically scanning a paper copy of said ASP document to provide a digital signal representative of said paper copy of said ASP document; and
storing said digital signal in said memory.

31. The system of claim 29, wherein said processor is configured to input said ASP document into said ASP user device by downloading an electronic copy of said ASP document from an external source to said memory.

32. The system of claim 29, wherein said processor is configured to transfer said ASP document via said network by sending said ASP document to said remote document manager at said predetermined time.

33. The system of claim 29, wherein said processor is configured to transfer said ASP document via said network by sending said ASP document to said remote ASP at said predetermined time.

34. The system of claim 29, wherein said processor is further configured to receive a storage operation report at said ASP user device.

35. The system of claim 34, wherein said processor is configured to receive a storage operation report by receiving said storage operation report from said remote document manager.

36. The system of claim 34, wherein said processor is further configured to receive said storage operation report from said remote ASP device.

37. The system of claim 34, wherein said processor is further configured to clear said ASP document from said memory.

38. The system of claim 23, wherein said processor is configured to determine whether said ASP document is a storage document for storing in said remote ASP or a retrieval document for retrieving from said remote ASP by:
determining that said ASP document is a retrieval document based on an operator input to said ASP user device;
generating a document retrieval request in said ASP user device;
sending said document retrieval request to said remote document manager via said network; and
receiving said retrieval document at said predetermined time.

39. The system of claim 38, wherein said processor is configured to receive said retrieval document by receiving said retrieval document from said remote document manager at said predetermined time.

40. The system of claim 38, wherein said processor is configured to receive said retrieval document by receiving said retrieval document from said remote ASP at said predetermined time.

41. The system of claim 38, wherein said processor is further configured to generate a document retrieval result report.

42. The system of claim 41, wherein said processor is further configured to send said document retrieval result report to said remote document manager via said network.

43. The system of claim 41, wherein said processor is further configured to send said document retrieval result report to said remote ASP manager via said network.

44. A system for managing applications service provider (ASP) documents, comprising:
means for requesting a transfer of an ASP document at an ASP user device connected to a remote document manager and a remote ASP via a network;

means for determining whether said ASP document is either a storage document for storing in said remote ASP or a retrieval document for retrieving from said remote ASP;

means for establishing a predetermined time for effecting the transfer of said ASP document between the user and the ASP; and means for transferring said ASP document at a predetermined time via said network.

45. The system of claim 44, further comprising:

means for logging on to said remote document manager by the ASP user device, wherein said means for requesting a transfer comprises means for inputting a deferred transfer option from a menu received from said remote document manager via said network after said user device logs on to said remote document manager.

46. The system of claim 44, wherein said means for determining whether said ASP document is a storage document for storing in said remote ASP or a retrieval document for retrieving from said remote ASP comprises:

means for determining that said ASP document is a storage document based on an operator input to said ASP user device; and means for inputting said storage document into said ASP user device, wherein said means for transferring comprises means for transferring said ASP document via said network at said predetermined time.

47. The system of claim 46, further comprising means for receiving a storage operation report at said ASP user device.

48. The system of claim 44, wherein said means for determining whether said ASP document is a storage document for storing in said remote ASP or a retrieval document for retrieving from said remote ASP comprises:

means for determining that said ASP document is a retrieval document based on an operator input to said ASP user device;

means for generating a document retrieval request in said ASP user device;

means for sending said document retrieval request to said remote document manager via said network; and means for receiving said retrieval document at said predetermined time.

49. The system of claim 48, further comprising means for generating a document retrieval result report.

50. The system of claim 49, further comprising means for sending said document retrieval result report to said remote document manager via said network.

51. The system of claim 49, further comprising means for sending said document retrieval result report to said remote ASP manager via said network.

* * * * *